United States Patent [19]

McDonald et al.

[11] 4,288,870

[45] Sep. 8, 1981

[54] INTEGRATED TELEPHONE TRANSMISSION AND SWITCHING SYSTEM

[75] Inventors: John C. McDonald; James R. Baichtal, both of Los Altos; Bradley A. Helliwell, Los Gatos; Alexander C. Ling, Mountain View; Craig P. Schaffter, Sunnyvale, all of Calif.

[73] Assignee: TRW, Inc., Los Angeles, Calif.

[21] Appl. No.: 874,521

[22] Filed: Feb. 2, 1978

[51] Int. Cl.³ .............................................. H04J 3/00
[52] U.S. Cl. .................................. 370/56; 179/18 EE; 370/67; 370/68
[58] Field of Search ........ 179/15 AQ, 15 AT, 18 FC, 179/15 BY; 370/58, 67, 68, 56, 110

[56] References Cited

U.S. PATENT DOCUMENTS

| | | | |
|---|---|---|---|
| 3,514,541 | 5/1970 | Inose et al. ...................... | 179/15 AQ |
| 3,649,763 | 3/1972 | Thompson ....................... | 179/15 AQ |
| 3,870,826 | 3/1975 | Carbrey et al. ................. | 179/15 BY |
| 3,912,873 | 10/1975 | Skaperda ......................... | 179/18 FC |
| 3,920,916 | 11/1975 | Brightman et al. ............. | 179/15 AL |
| 3,997,728 | 12/1976 | Duquesne et al. .............. | 179/15 BY |
| 4,001,514 | 1/1977 | Wurst .............................. | 179/18 FC |
| 4,004,099 | 1/1977 | Jones et al. ...................... | 179/15 AL |
| 4,028,495 | 6/1977 | Funamo et al. ................. | 179/15 AT |
| 4,069,399 | 1/1978 | Barrett et al. ................... | 179/15 AL |
| 4,070,551 | 1/1978 | Weir ................................ | 179/18 FC |
| 4,071,703 | 1/1978 | Schaffter ........................ | 179/15 AQ |
| 4,071,704 | 1/1978 | Moed .............................. | 179/15 BF |
| 4,140,877 | 2/1979 | Joslow et al. .................... | 370/67 |
| 4,146,748 | 3/1979 | Troost et al. ................... | 179/15 AT |

OTHER PUBLICATIONS

Special Issue on Telecommunications Circuit Switching, *Proceedings of the IEEE*, Sep. 1977, pp. 1235–1390.
*Telesis* (entire issue), vol. 5, No. 4, Aug. 1977, Bell Northern Research Ltd.
"Generic Digital Switching System", N. J. Skaperda, ISS (1976) Conference Record, pp. 223-4-1 to 223-4-8.
"A Digital Network Compatible Subscriber Carrier System", Budd et al., ISSLS (London, 1976) Conference Record, pp. 143–147.

*Primary Examiner*—Thomas W. Brown
*Attorney, Agent, or Firm*—Flehr, Hohbach, Test

[57] ABSTRACT

An integrated telephone transmission and switching system operating in a multiframe format where each frame consists of a plurality of time slots and includes a base switch connected to a plurality of multitime slots data buses where the base switch operates to switch encoded data between any specified time slots on any of the buses. A subscriber switch is connected between a plurality of subscriber lines and to a pair of multitime-slot data buses and operates to connect and concentrate the local subscriber lines to the specified time slots on the pair of data buses, thereby enabling connections between a local subscriber line and any other subscriber line connected to the system.

31 Claims, 17 Drawing Figures

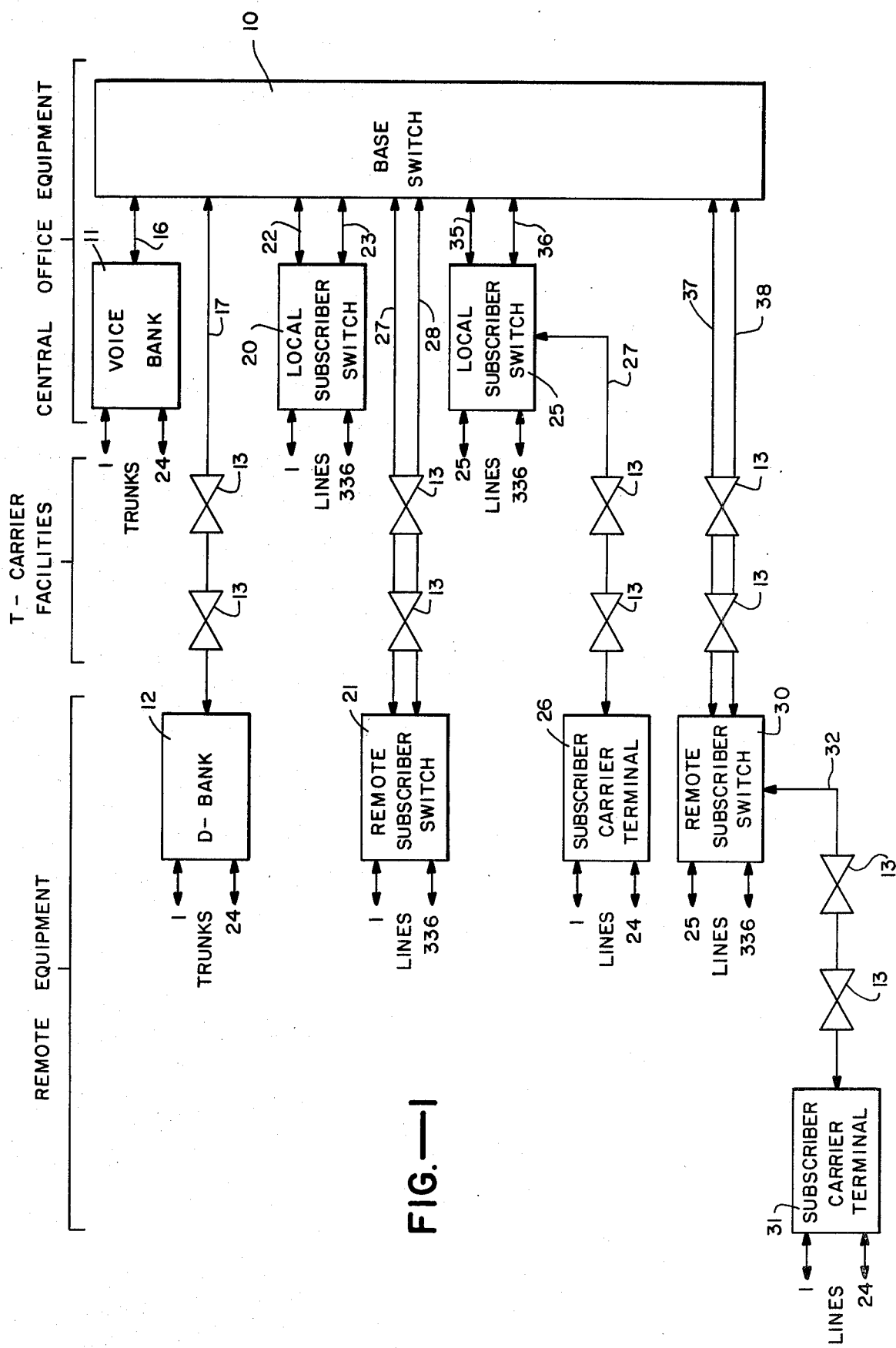
FIG.—1

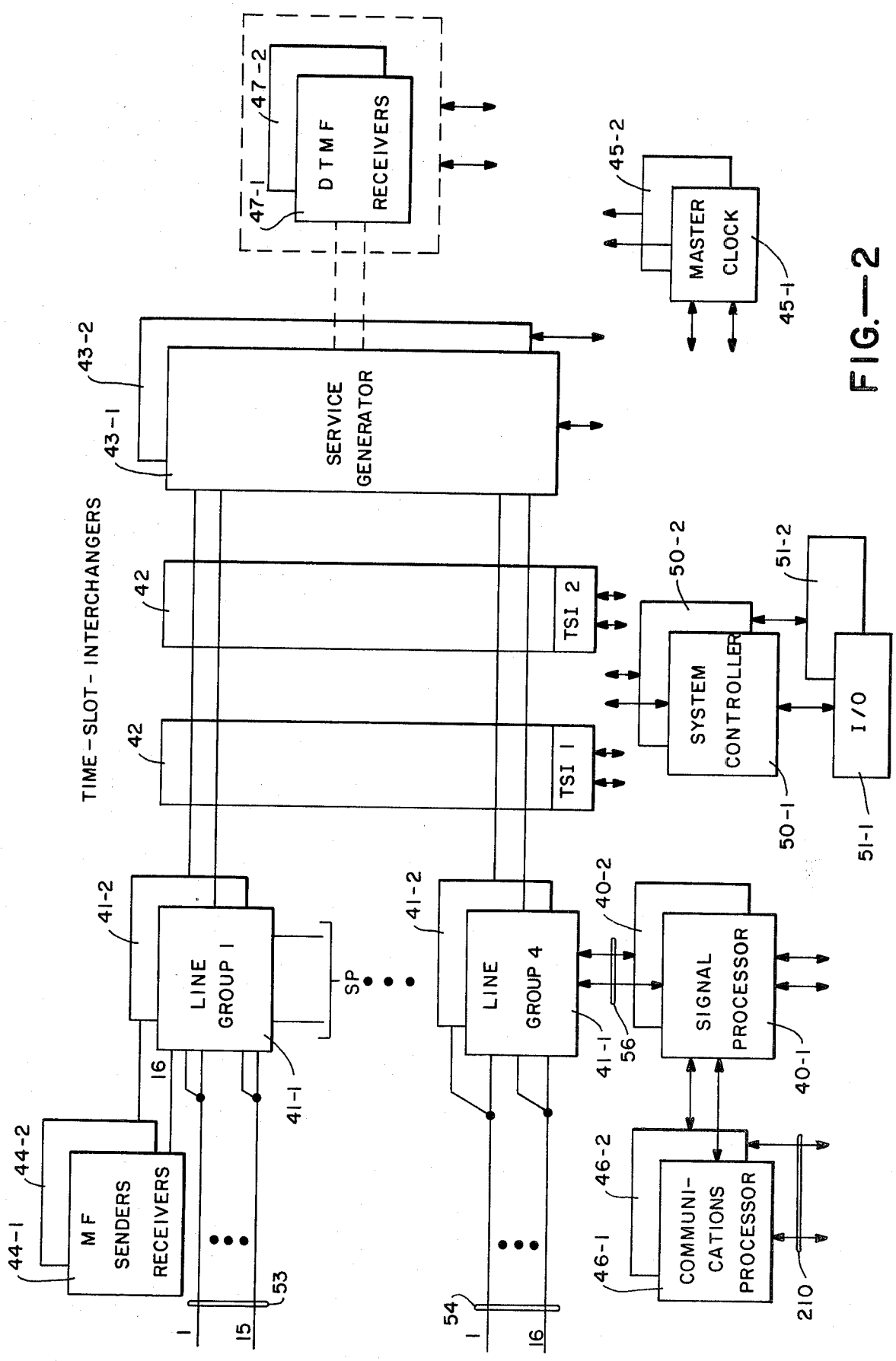
FIG.—2

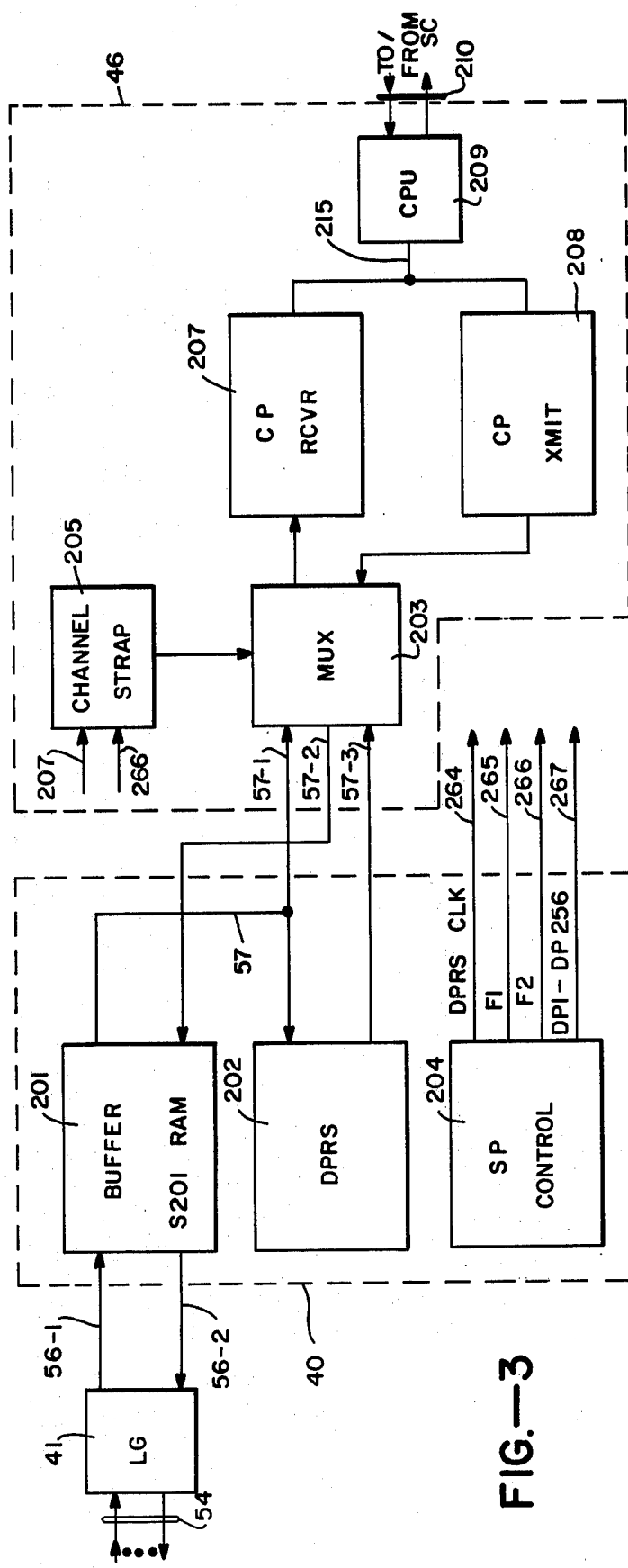
FIG.—3
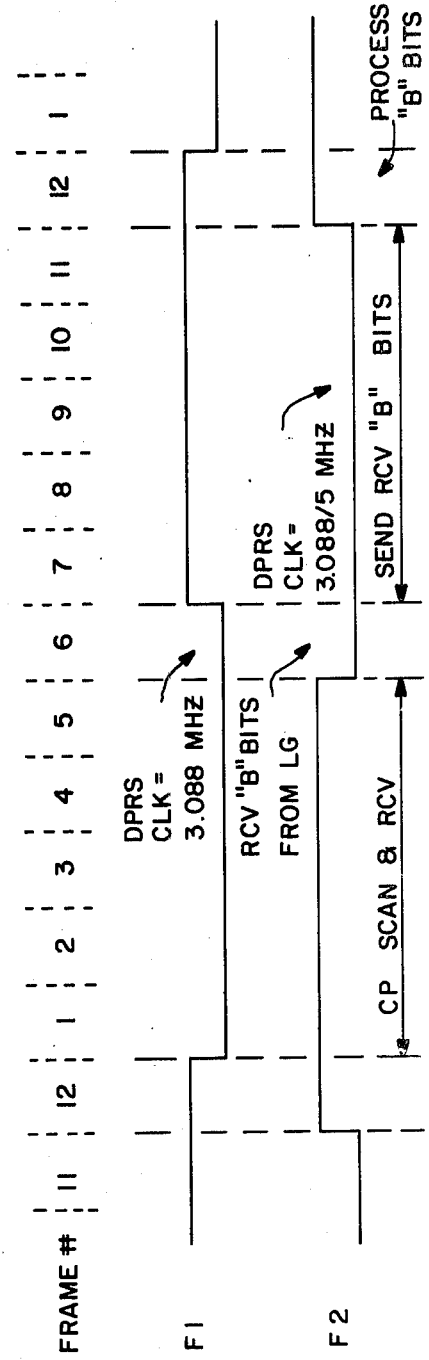
FIG.—6

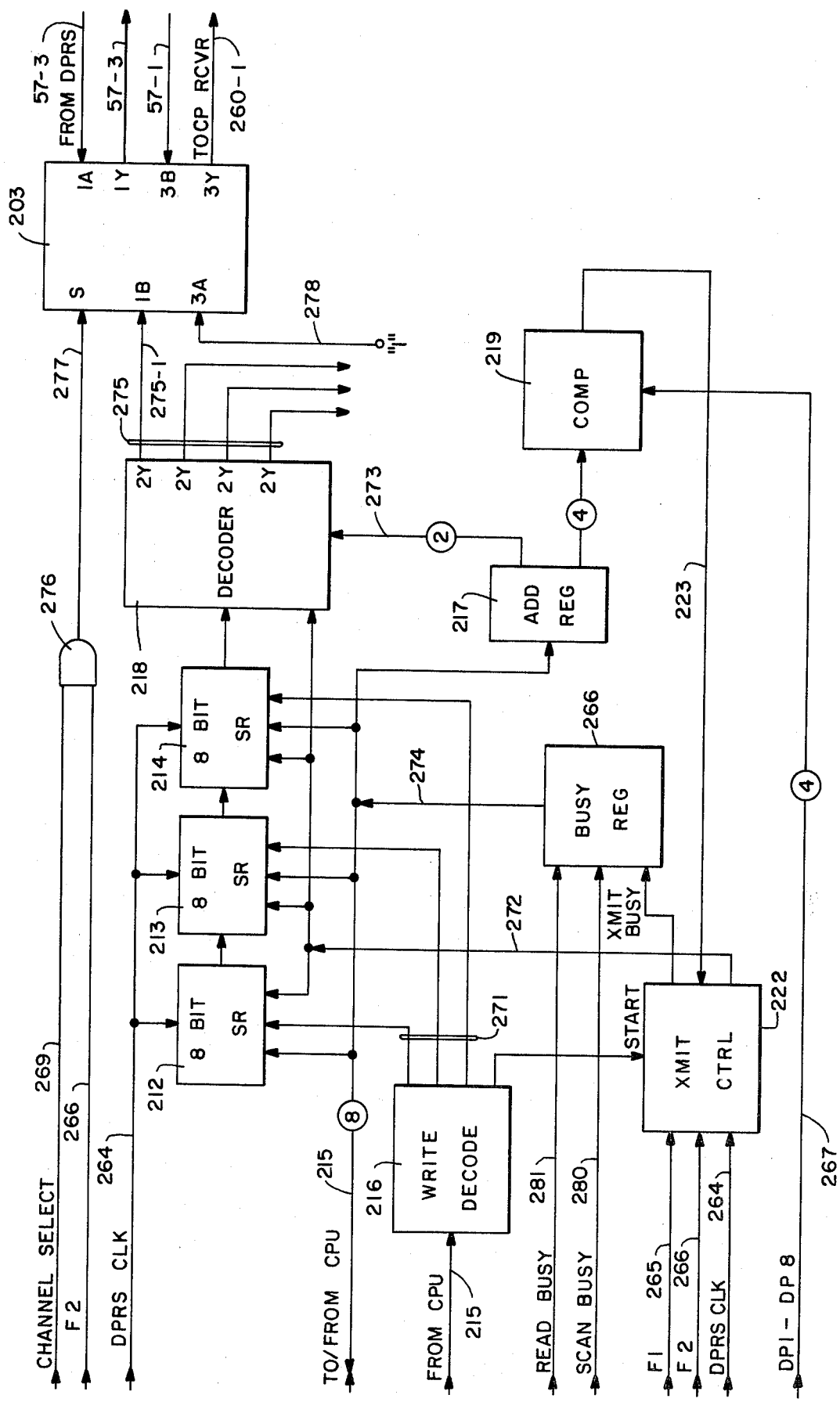
FIG.—4

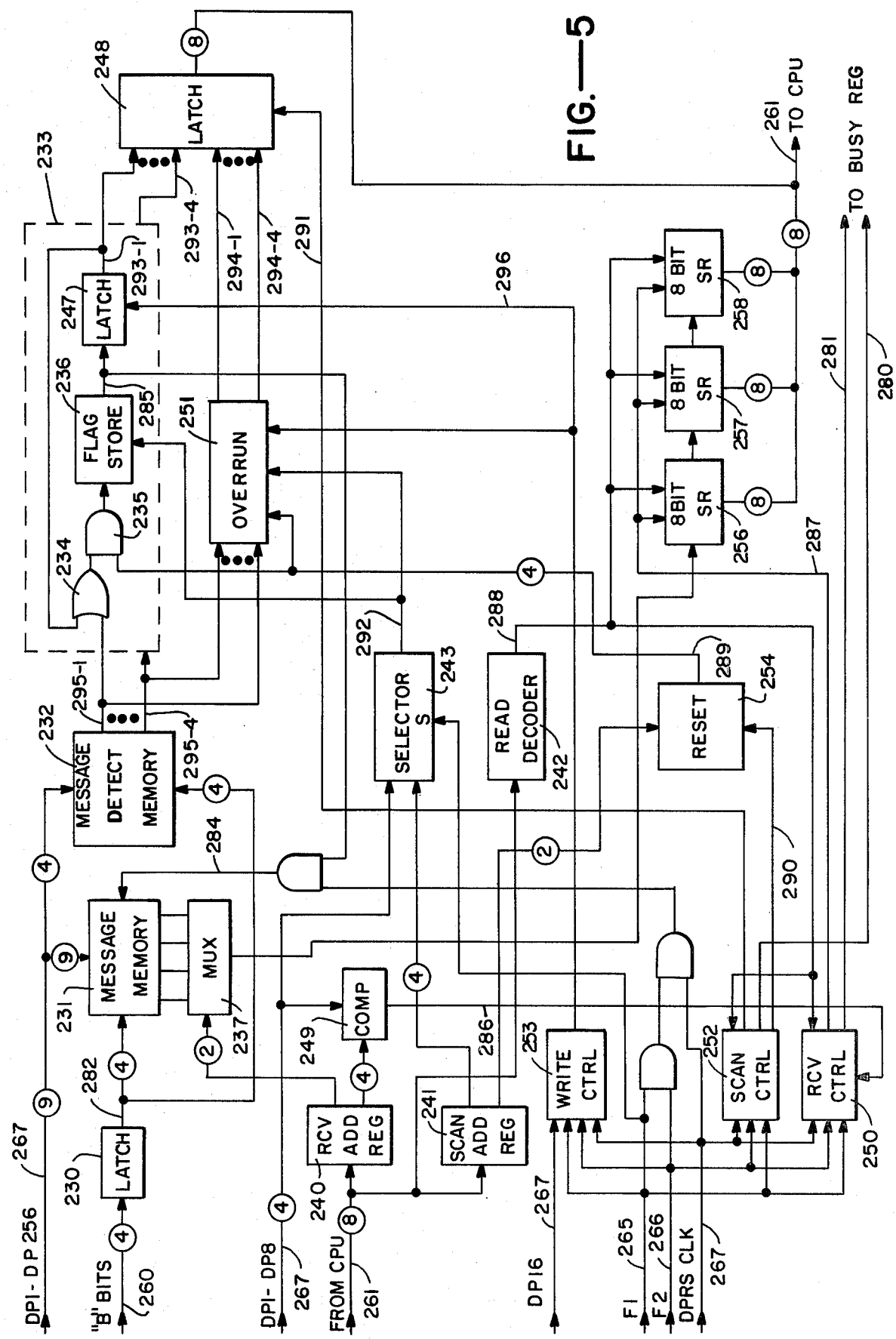

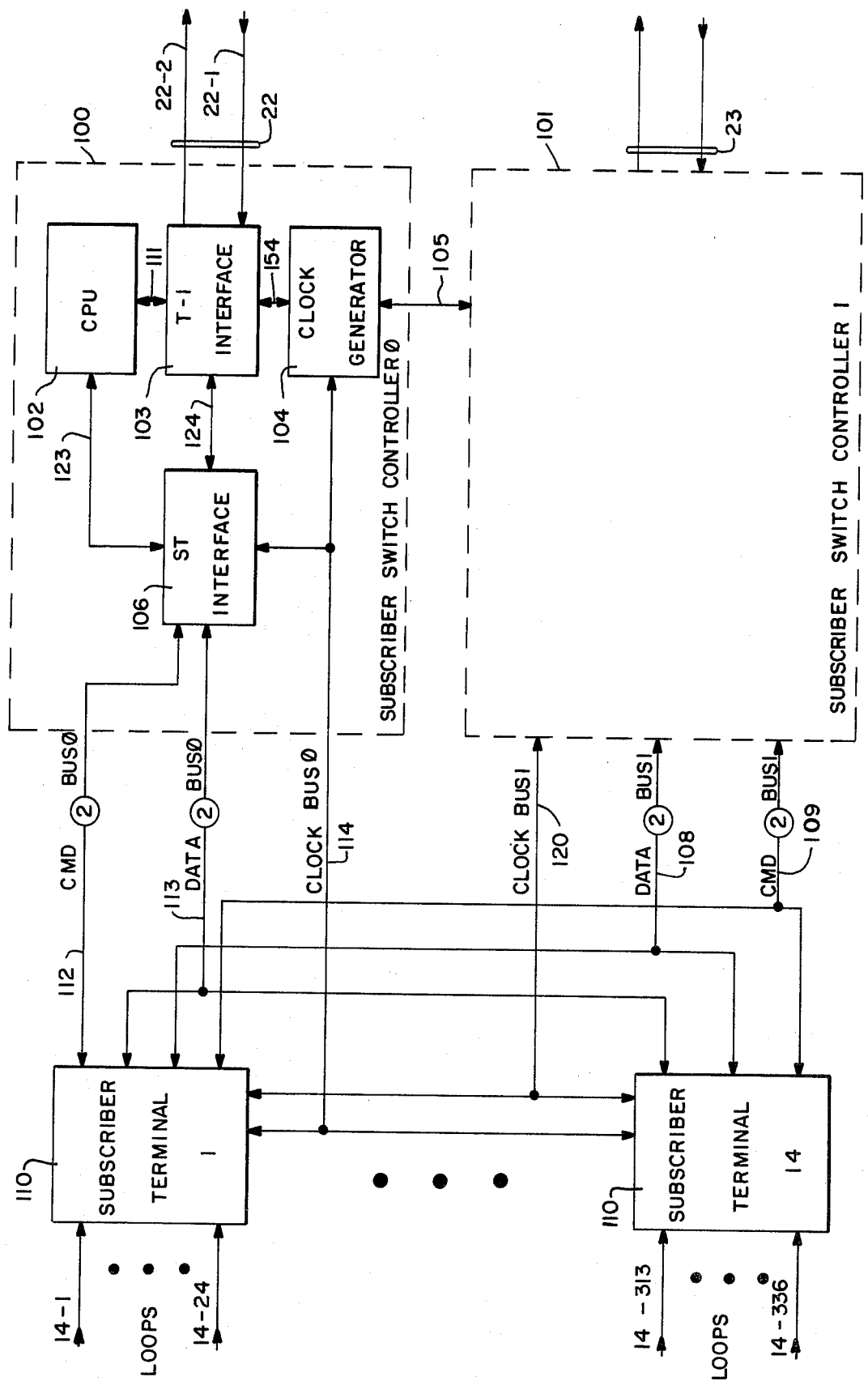
FIG.—7

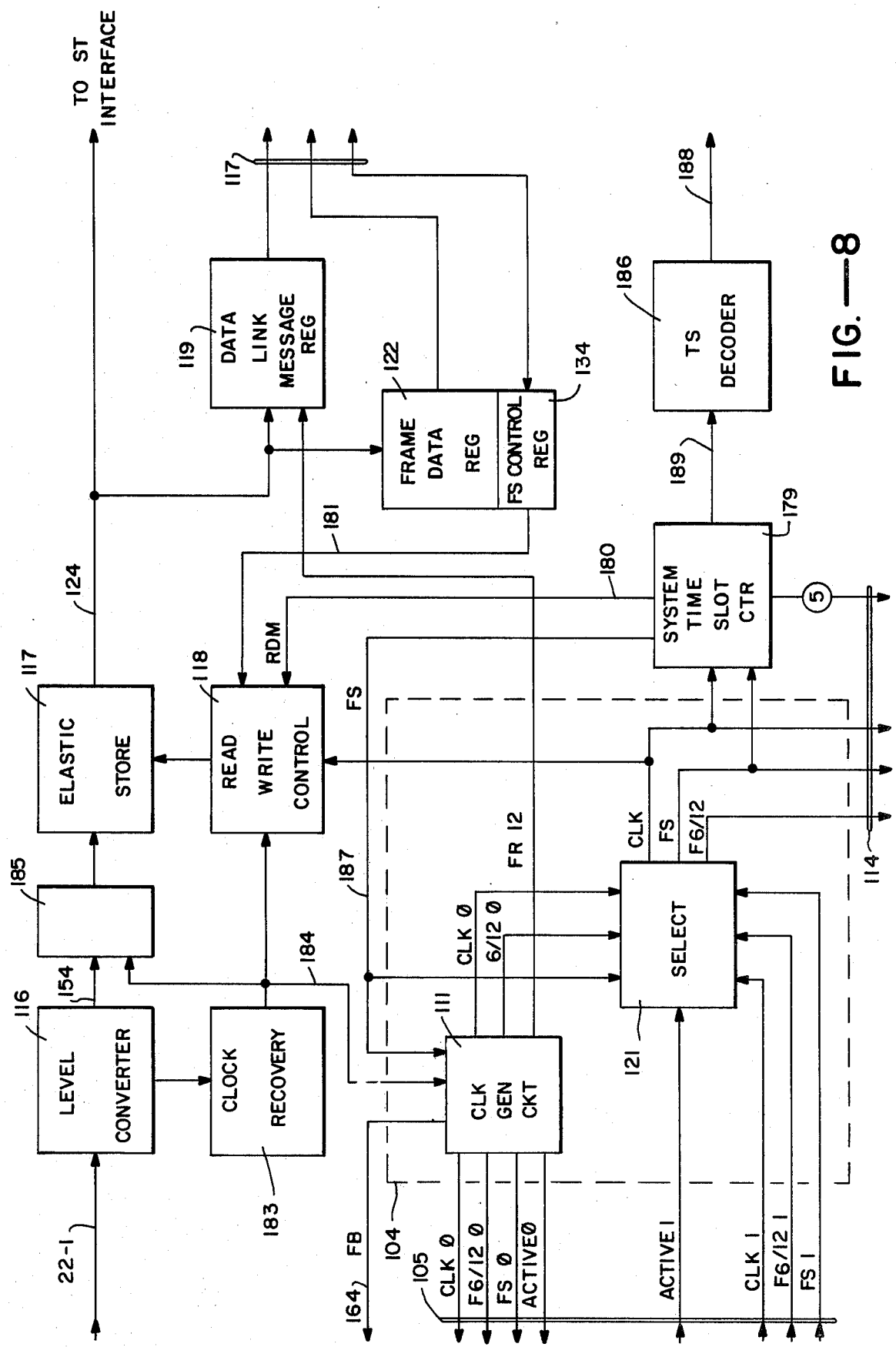
FIG.—8

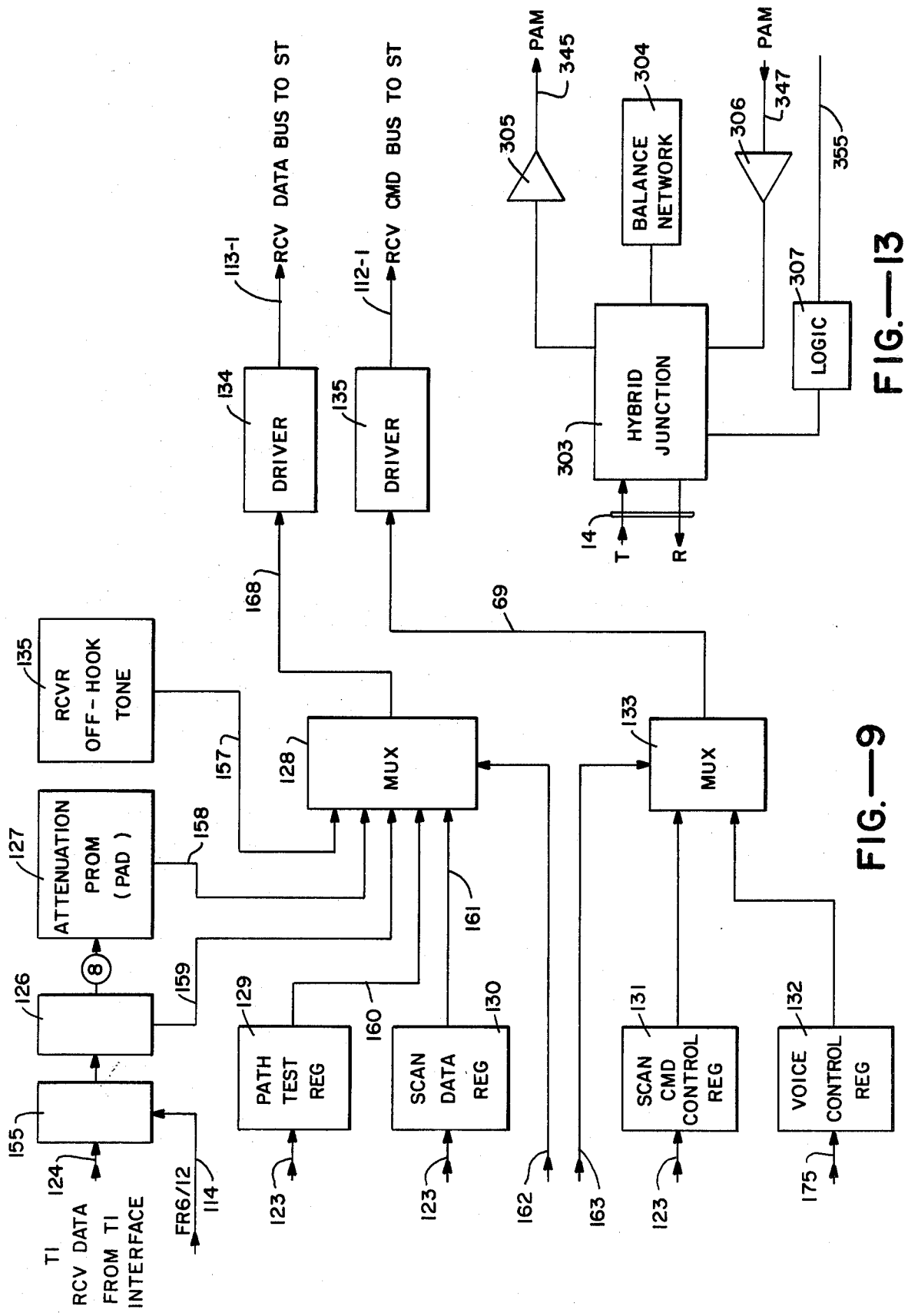

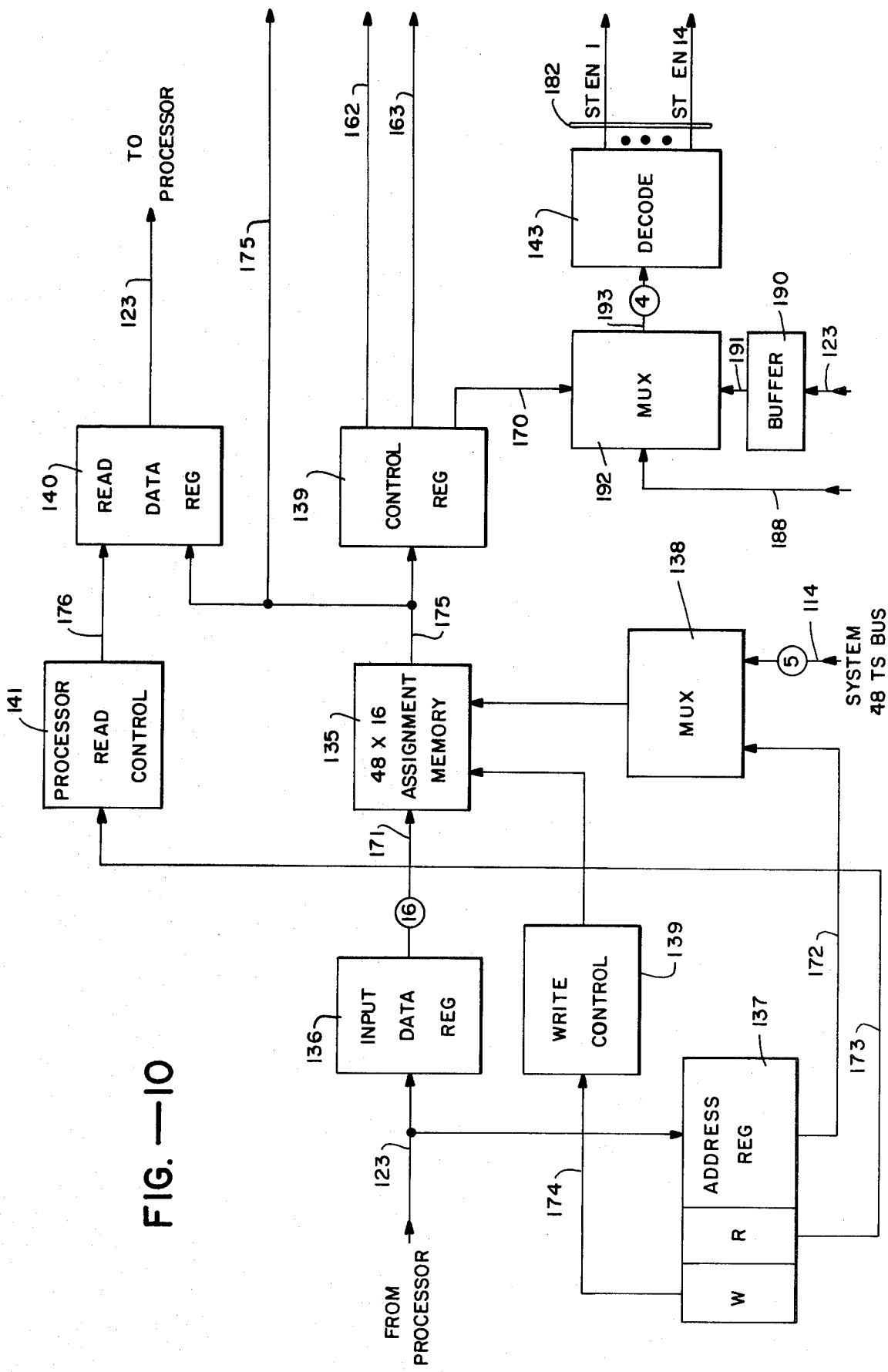
FIG.—10

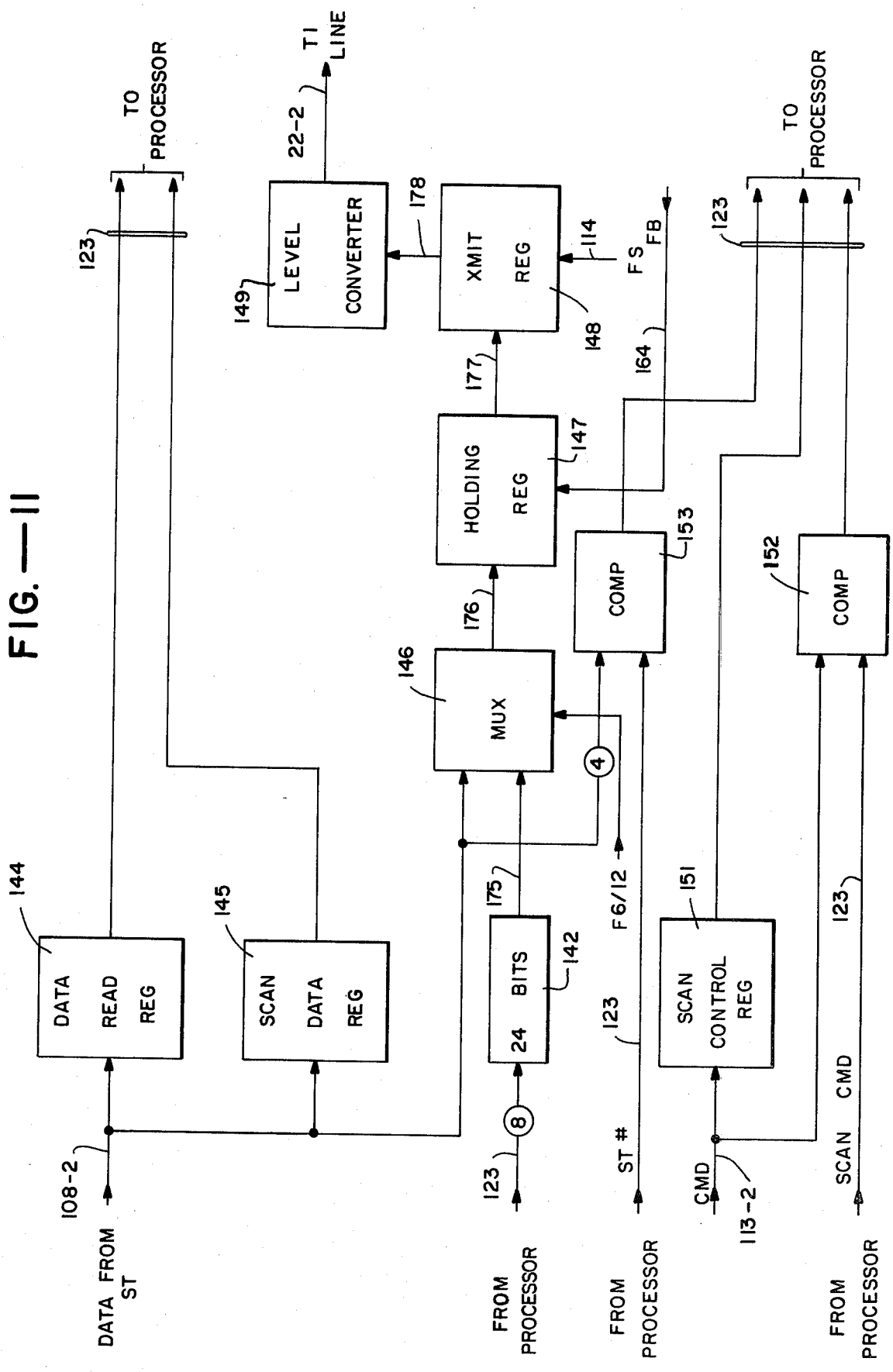

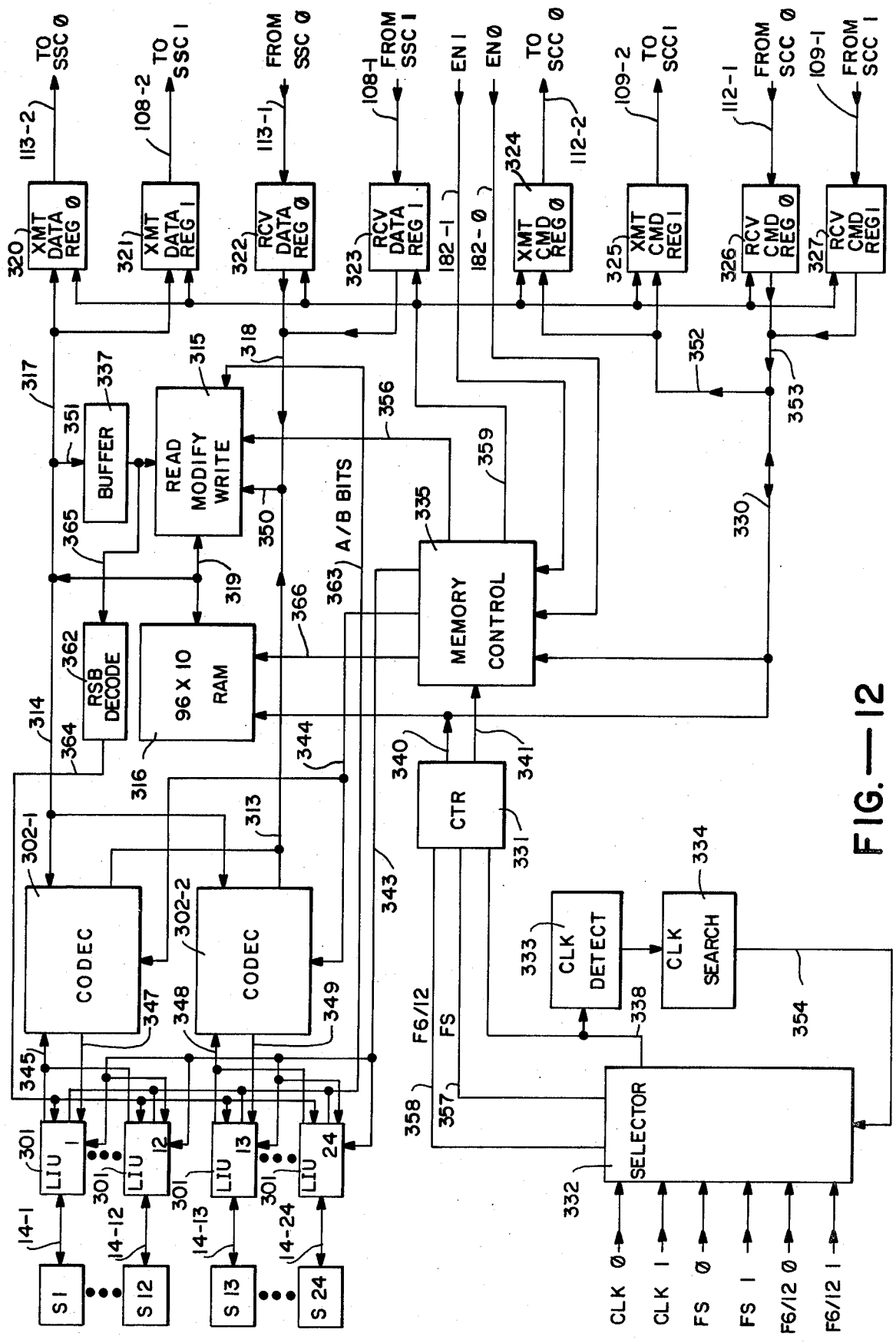
FIG.—12

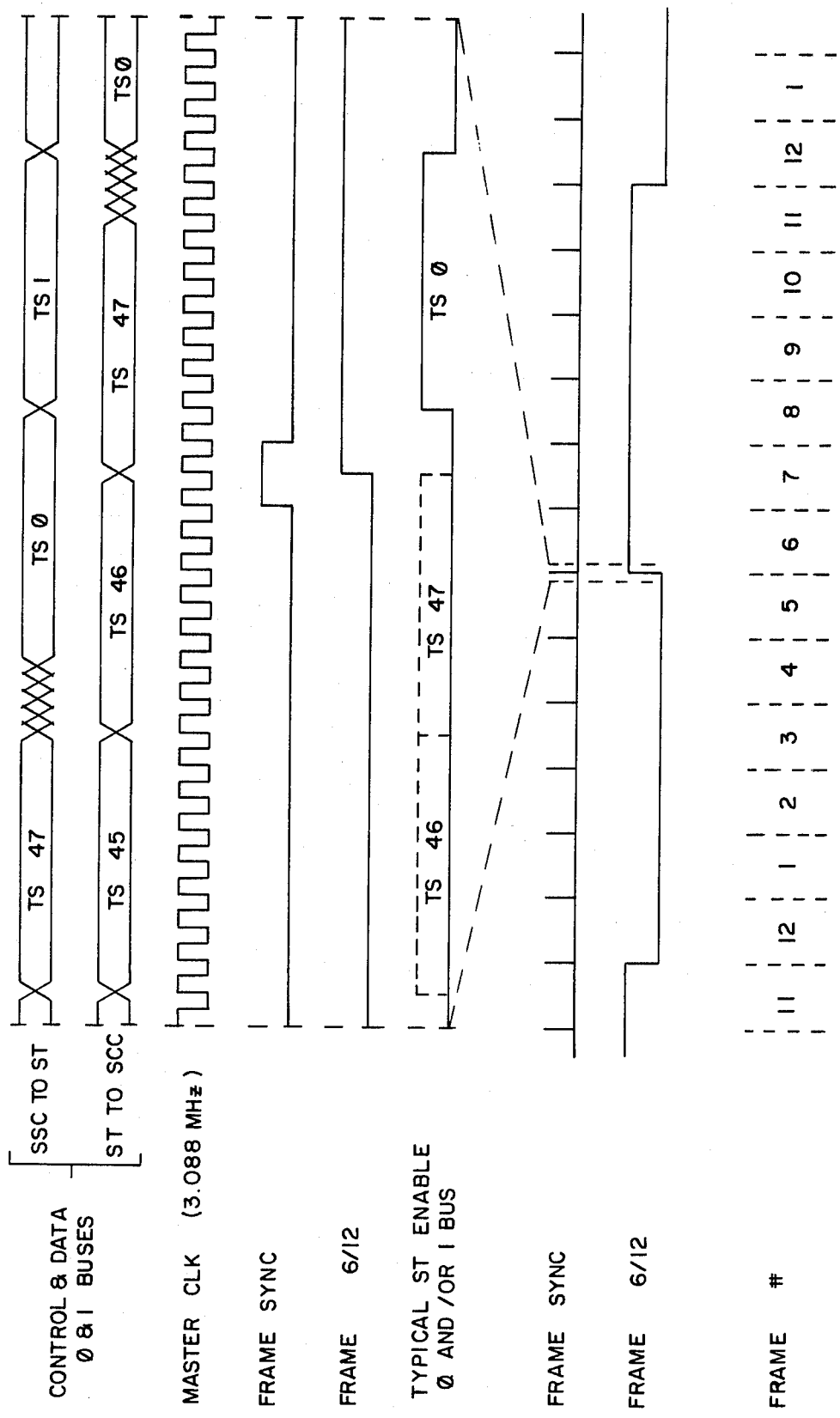
FIG.—14

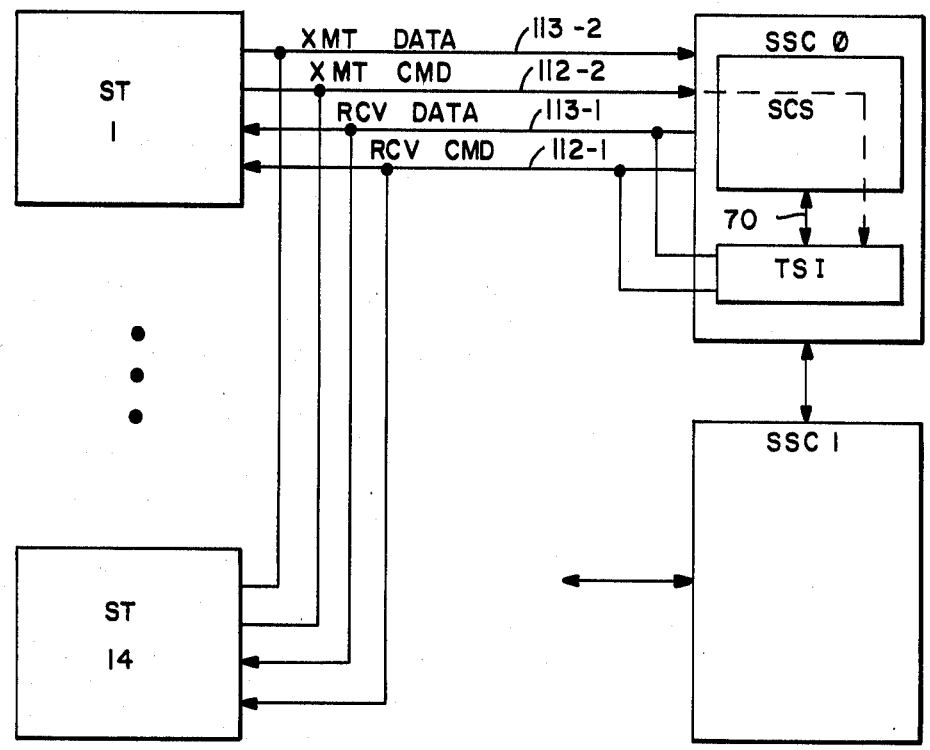
FIG.—15
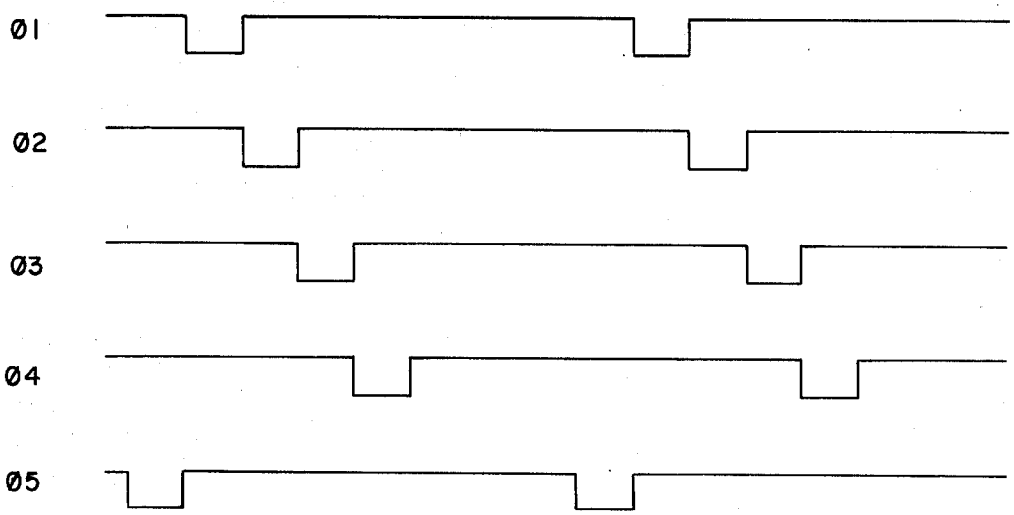
FIG.—16

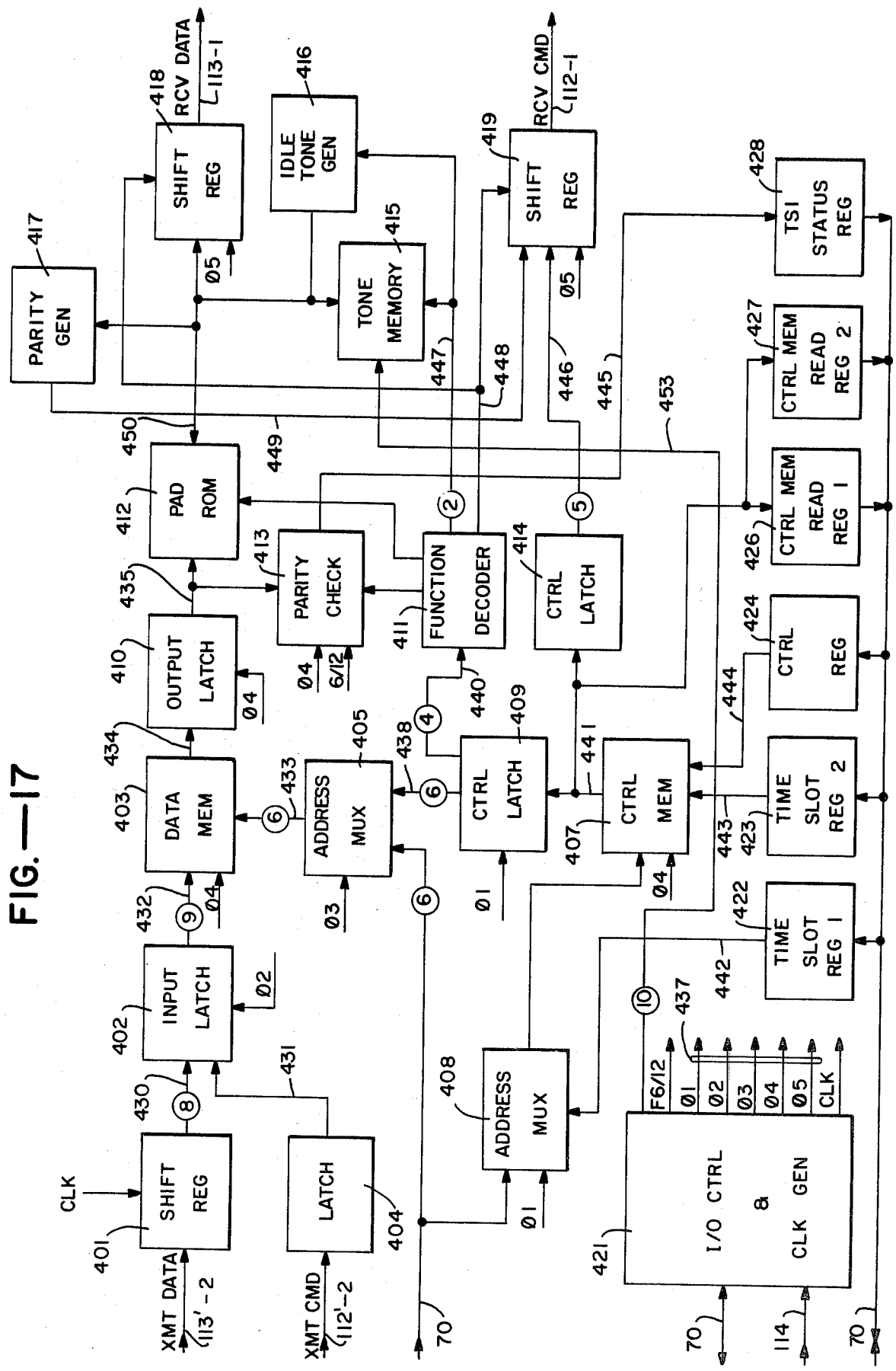
FIG.—17

INTEGRATED TELEPHONE TRANSMISSION AND SWITCHING SYSTEM

CROSS REFERENCE TO RELATED APPLICATIONS

1. An Integrated Message Accounting System, Ser. No. 781,348, filed Mar. 25, 1977, now U.S. Pat. No. 4,172,214, issued Oct. 23, 1979, invented by John C. McDonald and James L. Baichtal, and assigned to the same assignee as the present invention.

2. Dial Pulse Register/Sender, Ser. No. 762,801, filed Jan. 26, 1976, now U.S. Pat. No. 4,133,980, issued Jan. 9, 1979 invented by Johannes A. R. Moed, and assigned to the same assignee as the present invention.

BACKGROUND OF THE INVENTION

The present invention relates to digital telephone switching systems and more particularly to an improved integrated telephone transmission and switching system.

Digital telephone switching systems have been utilized in automatic message accounting systems such as described in the cross-referenced application entitled "Integrated Message Accounting System." That system, which may be termed a base switch, utilizes pulse code modulated (PCM) techniques for switching telephone signals in PCM format from one time slot on a multitime slot digital data bus commonly known as a T-1 line to any other time slot on any T-1 line in the system. A T-1 line generally has 24 time slots each having eight bits together with a framing bit for a total of 193 bits per frame operating in a multiframe format of 12 frames. The base switch handles in one embodiment up to 64 T-1 lines or 1536 time slots and additionally provides for detecting, sending and receiving of dial pulses, detecting on-hook and off-hook conditions indicated in the signaling frames of a multiframe format, generating and sending necessary service tones in PCM format and sending and receiving multifrequency tones.

It would be desirable to utilize the existing digital switching capabilities of the above described system at a local subscriber line level so that a plurality of local subscribers can be connected to the base switch thereby enabling connections to any other subscriber line in the telephone system.

In view of the above background, it is an objective of the present invention to provide an improved integrated transmission and switching system.

SUMMARY OF THE INVENTION

The present invention relates to an integrated telephone transmission and switching system.

The system operates in a multiframe format where each frame consists of a plurality of time slots and includes a base switch connected to a plurality of multitime slot data buses where the base switch operates to switch encoded data in any time slot on to any specified time slot on any of the buses. Also included is a subscriber switch connected to a plurality of subscriber lines and to a pair of the multitime slot buses. The subscriber switch operates under control of the base switch to connect and concentrate the local subscriber lines to the specified time slots on one of the pair of data buses, thereby enabling connections between a local subscriber line and any other subscriber line connected to the system.

In one embodiment, a subscriber switch is connected to 336 local subscriber lines and provides means for interconnecting and concentrating the 336 subscribers to a pair of T-1 lines, where each T-1 line carries 24 time slots between the subscriber switch and the base switch. The base switch specifies which subscriber line is connected to which time slot on the pair of T-1 lines, thereby enabling connections of 336 subscriber lines to specified ones of the 48 time slots on the T-1 lines, thereby enabling the base switch to interconnect the subscriber switch to any of the T-1 lines. A subscriber switch is also capable of interconnecting any local subscriber line to any other subscriber line within the same switch.

The base switch provides instructions to the subscriber switch via a communication processor which sends instructions to the subscriber switch over an associated T-1 line. The subscriber switch in response to the message from the base switch activates connections between a specified subscriber line and a specified time slot on one of the pair of data buses.

In accordance with the above summary, the present invention achieves the objective of providing an improved integrated transmission and switching system for providing digital connections between local subscriber lines and any other subscriber line in the telephone system.

Additional objects and features of the invention will appear from the description in which the preferred embodiments of the invention have been set forth in detail in conjunction with the drawings.

DESCRIPTION OF THE DRAWINGS

FIG. 1 depicts a block diagram of an integrated transmission and switching system in accordance with the present invention.

FIG. 2 depicts a block diagram of a base switch, which forms a portion of FIG. 1.

FIG. 3 depicts a block diagram of a communication processor, which forms a portion of FIG. 2.

FIG. 4 depicts a block diagram of a communication processor transmitter, which forms a portion of FIG. 3.

FIG. 5 depicts a block diagram of a communication processor receiver, which forms a portion of FIG. 3.

FIG. 6 depicts a timing diagram for the communication processor of FIG. 3.

FIG. 7 depicts a block diagram of a local subscriber switch, which forms a portion of FIG. 1.

FIG. 8 depicts a block diagram of a T-1 interface, which forms a portion of FIG. 7.

FIG. 9 depicts a block diagram of a portion of a subscriber terminal interface, which forms a portion of FIG. 7.

FIG. 10 depicts a block diagram of another portion of a subscriber terminal interface, which forms a portion of FIG. 7.

FIG. 11 depicts a block diagram of still another portion of a subscriber terminal interface, which forms a portion of FIG. 7.

FIG. 12 depicts a block diagram of a subscriber terminal, which forms a portion of FIG. 1.

FIG. 13 depicts a block diagram of a line interface unit, which forms a portion of FIG. 12.

FIG. 14 depicts a timing diagram for the switch of FIG. 7.

FIG. 15 depicts a block diagram of a remote subscriber switch, which forms a portion of FIG. 1.

FIG. 16 depicts a timing diagram for the subscriber switch of FIG. 15.

FIG. 17 depicts a block diagram of a time slot interchanger, which forms a portion of FIG. 15.

DETAILED DESCRIPTION OF THE DRAWINGS

FIG. 1—Block Diagram

Referring to FIG. 1, a block diagram of one embodiment of an integrated digital transmission and switching system (local digital switch) is shown which provides Class 5 central office switching functions. It includes a base switch 10 and one or more subscriber switches such as local subscriber switches 20, 25 and remote subscriber switches 21, 30. The subscriber switches such as switch 20 concentrate and connect a plurality of subscriber lines to the base switch 10. For example, local subscriber switch 20 concentrates and connects up to 336 subscriber lines to the base switch via buses 22, 23.

In one approach for a digital telephone switching system, a multiplicity of conversations are multiplexed serially along a two-wire digitally multiplexed line commonly known as a T-1 line, such as buses 22, 23 in FIG. 1. Each T-1 line has 24 pulse code modulated (PCM) time slots operating in a basic time frame of 125 μsec. Each time slot is allocated 8 bits in which sampled data between a calling party and a called party is digitally represented in PCM format. Each frame of 125 μsec includes one frame bit plus 24 time slots of 8 bits each or a total of 193 bits per frame, with the frame rate based upon a sampling rate of 8 KHZ (the reciprocal of 125 μsec). A typical frame structure known in the art includes a multi-frame format of 12 frames of 193 bits each, in which the eighth bit of each time slot in frames 6 and 12 carries a signaling bit. The signaling bits are used by signal processing circuitry to detect supervisory signals such as on hook, off hook and dial pulse.

In FIG. 1, the base switch 10 is connected to a voice bank 11 via T-1 line 16. Voice bank 11 is well-known equipment which interfaces to 24 trunks, which thereby allows for trunk termination directly on the base switch 10. In one embodiment, the base switch 10 interfaces to the world on 64 T-1 lines (a total of 1536 time slots) and can switch non-blocking between any of its time slots. The base switch 10 is described in the cross-referenced application entitled "An Integrated Message Accounting System".

Each of the 24 or 48 channels between a switch subh as subscriber switch 20 and the base switch 10 is referred to as a junctor. The subscriber switches may be collocated with the base switch 10 such as switches 20, 25 or located at a remote site such as remote subscriber switches 21, 30. A remote subscriber switch can interconnect the 336 subscriber lines within the switch. The subscriber carrier terminals (SCT) 26, 31 connect 24 subscriber lines to T-1 lines 27, 32, which provides connections to particular subscriber switches. Equipment remotely located is connected to the various switches through repeaters 13. In one embodiment, a local (LSS) or remote (RSS) subscriber switch can handle up to 336 local loops for connection to the 48 time slots on the T-1 lines. Each subscriber switch, whether local or remote, uses two T-1 lines for connection to the base switch 10. Therefore, in a local subscriber line system with 6384 terminations, the RSS and LSS would require 38 of the available 64 base switch 10 ports available. This leaves 26 ports or 624 channels (26×24) for multi-frequency senders, receivers and trunks.

Various termination examples for the switching system described herein are as follows:

| Trunks | Service Ports | Subscriber Lines |
| --- | --- | --- |
| 1488 (62 T-1) | 48 (2 T-1) | 0 |
| 1416 (49 T-1) | 72 (3 T-1) | 336 (2 T-1) |
| 1272 (53 T-1) | 72 (3 T-1) | 1344 (8 T-1) |
| 1080 (45 T-1) | 72 (3 T-1) | 2688 (16 T-1) |
| 552 (23 T-1) | 72 (3 T-1) | 6384 (38 T-1) |

Before describing FIGS. 1–14 in further detail, a brief overview discussing the routing of a telephone call will be given. When a subscriber goes off hook, this condition is detected by a subscriber switch such as switch 20 and a message is sent to the base switch 10. The message contains the subscriber line number and state of the subscriber originating the call. The base switch 10 finds an idle junctor to the associated subscriber switch and sends a message to the subscriber switch commanding it to connect the subscriber line to the idle junctor. The subscriber switch will make the connection and perform a path test to determine if a path was set up correctly. The base switch 10 will connect dial tone by sending a message to an internal service generator commanding it to attach dial tone to the associated time slot. Dial tone is removed when the first digit is received. The called number is translated in the base switch by an internal system controller to determine how to route the call. For a local call, the base switch system controller checks if the called party is idle and determines the identity of the called party's particular subscriber switch. Ring back tone is applied to the calling party's line and message is sent to the called party's subscriber switch to command it to ring the appropriate line. When the called party answers, the ringing is stopped, the ring back tone is dropped and a path is established between the two junctors through the base switch. An idle junctor to that subscriber switch is selected and it is commanded to set up a connection between that junctor and the called party. No further action occurs until the call terminates and then the path in the base switch is dropped and messages are sent to the associated subscriber switches to command them to drop their connections and restore the lines to the idle condition.

FIG. 2—Base Switch

Referring to FIG. 2, the base switch 10 is shown and is described in more detail in the cross referenced application entitled "Integrated Message Accounting System". The base switch 10 provides switching functions and interfaces directly to 64 T-1 lines. T-1 interfaces are used to connect either local or remote subscriber switches via T-1 lines such as 22, 23 of FIG. 1. Switching functions are provided to connect calls between subscriber switches, either local or remote, and between subscriber switches and trunks. The base switch 10 incorporates redundancy features for each subsystem (primary and secondary) and for simplicity will generally be described herein for only the primary subsystems.

Briefly, the subsystems within base switch 10 include a signal processor 40, line groups 41, time slot interchanger 42, service generator 43, multi-frequency sender/receiver 44, and master clock 45, all of which are controlled by system controller 50. In addition, a communication processor 46 is connected with the signal processor 40 and to the system controller 50 to provide a communications link between subscriber switches and the base switch. The communications link is over associated T-1 lines between the subscriber switch and the base switch, such as lines 22, 23 of FIG. 1, which form a part of buses 53 or 54 of FIG. 2.

With a sampling frequency of 8,000 Hz for encoding PCM data, one timing frame equals 125 microseconds with 24 time slots per frame per T-1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame.

In a multiframe format of twelve frames, the frame bit occurs once at the start of each frame, with a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 2, quantizing a message signal by certain discrete levels or steps inherently introduces an intitial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 2, data on T-1 lines 53 are applied to both the primary and secondary line groups 41. For example, data is input to primary line group 41-1 and secondary line group 41-2.

As seen in FIG. 2, primary and secondary interface redundancy is employed in all major subsystems to prevent a single point failure which could cause the system to go down. Faulty subsystems are automatically switched off line to provide minimum interruption to service.

A line group 41 interfaces any T-1 line pairs 53 with time slot interchangers (TSI) 42, designated TSI 1-2. A line group 41 also interfaces multifrequency sender (MFS) and receiver (MFR) 44 with the TSI 42. A group such as line group 41 accepts bipolar PCM data from a T-1 line, which is converted by the line group to 9-bit parallel (includes parity bit) and sent to the time slot interchanger (TSI) 42. Error signals and signal bits are sent to the signal processor (SP) 40 for further analysis.

It is possible to operate 16 T-1 interfaces for each primary and secondary subsystem per line group. Each interface accomodates one T-1 line and up to four line groups per base switch may be used.

A line group organizes the data from 16 T-1 lines or 15 T-1 lines and the MFS onto a 384 time slot data bus 58 to the TSI's 42.

Referring to FIG. 2, the TSI's 42 switch channel time slot data (8 bits plus parity) from any of the four line groups to any other channel time slot of any other of the four line groups. For example, data from line group 1 could be sent to TSI and switched out to line group 4. When it is available from a line group data bus, the TSI's hold it until the proper time for output in the next frame and transmit the data to the line group data bus such as bus 59 for output. The TSI's 42 contain control and data memory for all time slots and communicate with both the primary and secondary system controllers (SC) 50-1, 50-2.

In FIG. 2, the service generator (SG) 43 provides capability to connect one of several standard tones in PCM format to any of the channel time slots. These tones include 1,000 Hz, 120 IPM busy, 60 IPM busy, dial tone, ring back tone and internal tones for the system. The SG 43 receives control signals from the respective system controller (SC 50).

The signal processor (SP) 40 monitors all the input channels for changes of state and dialed digits. Each time a channel is seized or released, or a digit is dialed, a message is sent to the respective SC 50 containing the channel member and the event. All the information needed to determine the changes of state or dial digits is time division multiplexed over several leads originating from the line group on bus 56.

The SP 40 also has the capability to seize or release channels or dial digits on these channels. Frames 6 and 12 are signaling frames. During these frames, the least significant bit of the 8 bit PCM byte is replaced with a signaling bit. Frame 6 is used for an "A" signaling bit and frame 12 is used for a "B" signaling bit. The signal processor uses the A signaling bit for seizure, release and dial digit detection. The B signaling bit is used for state change detection only.

The signal processor 40 receives and transmits "A" and "B" bits from and to the line groups 41 for on/off hooks and digits. The communication processor 46 performs the control and communication functions for the signal processor.

In one embodiment, the "B" signaling bits, which occur every twelve frames in a multi-frame format, are used to formulate a 24-bit message. All signaling bits are extracted from the T-1 lines by the line groups 41 and routed to the signal processor 40, which will process the signaling bits and route the messages to the system controller 50.

The communication processor 46 also performs the functions of "B" bit receivers and transmitters, interfacing and control, and channel selecting. The communication processor 46 receives and transmits the "B" bits that form the messages to and from the subscriber switches. "B" bits from all of the 64 T-1 ports are received and stored by processor 46. When a message is to be transmitted from the base switch 10 to a subscriber switch, the 24 bits are transferred to the processor 46 which then transmits them to the appropriate line group 41 at the correct time, as will be described.

In one embodiment, a message consists of four bytes of data where the first byte is a control byte and the last three bytes form the message to be sent or received. The CP 46 also scans its internal receivers to check if any messages have been received. If there is a message, it will be sent to the system controller 50. Messages received from the system controller are transferred to the appropriate line group.

In FIG. 2, the Master Clock 45 is a conventional device for generating all basic clock signals used by the base switch.

Should a single point failure occur somewhere in the primary system, the primary system controller 50-1 will deactivate the on-line system by de-activating an "Active" signal. The off-line system will go on-line by the secondary system controller 50-2 activating the secondary master clock 45-2, thereby switching the secondary (redundant) system on-line to process data.

The MF senders (MFS) 44 generate and output MF tone pairs onto a line group data bus 58 for switching through the time slot interchangers 42 to an outgoing path such as bus 59 and communicate directly with system controllers 50. The MF receivers (MFR) detects MF tones in PCM digital input form on bus 58 and send them to the SC 50.

The MFS and MFR jointly share one group of 24 time slots and associated control facilities. A minimum of 8 time slots and a maximum of 16 time slots for each sender and each receiver are available to traffic at any time subject to a total maximum of 24 time slots. Systems with more than one line group may be equipped with the above capacity per line group as required by traffic.

The dual tone multifrequency receivers (DTMF) 47 are connected to the service generator for detecting dual tone multifrequency tones at a local level and operate in a manner similar to the MFR 44.

The primary and secondary system controllers (SC) 50 are typically INTEL 8080A stored program microprocessors surrounded by a number of a peripheral I/O devices 51 and interfaced to each subsystem.

The System Controllers 50 provide the following functions:

(1) call processing including routing, ANI (Automatic Number Identification), ONI, recorded announcement control and creation of billing records;

(2) SC self test; and (3) system test and maintenance data outputs for accumulation of traffic monitoring data and generation of traffic monitoring reports. The secondary (redundant) SC 50-2 is updated continuously so that it can assume control of the system with a minimum disruption to service should primary SC 50 experience a failure.

To enable the secondary system controller to come on line and start processing calls should the primary system controller experience a failure, portions of the memory containing the states of all calls in progress are periodically copied into the memory of the secondary system controller through direct memory access techniques which are well known in the art.

Each system controller is equipped with 64K bits of memory addressable by a 16-bit address bus. Further details of the operation of the Intel 8080A microprocessor are described in the Intel 8080A System User's Manual.

FIGS. 3-5 Communications Processor

Referring to FIG. 3, a block diagram of the communication processor 46 is shown. For simplicity, the communication processor 46 is shown connected to one line group, but it is to be understood that processor 46 is also connected to the other line groups in the systems. Data is input on T-1 lines 54 to line group 41 and the A & B signaling bits are gated out on bus 56-1 at the appropriate time into a buffer 201 (S201 RAM) which forms a part of the signal processor 40, the details of which are described in more detail in the cross-referenced application entitled "Register/Sender". The A & B signaling bits are then gated on bus 57 into the dial pulse register sender (DPRS) 202 of the signal processor 40, or into a multiplexer 203 (LS157). Timing signals provided from the signal processor control circuit 204, as seen in FIG. 6, are the DPRS CLK, F1, F2 on buses 264-66. The DP1-DP256 signals on bus 267 provide addressing for up to 386 time slots. The F1 and F2 signals identify frames 1-5, 6, 7-11, and 12, and DPRS CLK provides appropriate clocking during those periods.

The channel selector 205 includes a conventional selector (74150) connected to each line group for identifying which T-1 lines are connected to a subscriber switch. In one embodiment, there are four selectors, one each for the four line groups. The selectors are addressed by the DP1 DP8 signals on bus 267 from the SP control 204. Selector 205 identifies which of the T-1 lines are connected to the subscriber switches, and when ANDed with the F2 signal, will inform the communication processor 46 at which time transmitting and receiving signals to and from a particular subscriber switch can be effected.

The communication processor 46 also includes a CP receiver 207, CP transmitter 208, and central processing unit (CPU) 209, which typically is an Intel 8080A microprocessor and storage circuitry.

The communication processor 46 communicates with the base switch system controller 50 of FIG. 2 via buses 210. In order to manipulate the B signaling bit for data communications between the base switch 10 and a subscriber switch the B signaling bits are input from line group 41 into buffer 201 for connecting the signaling bits to either the DPRS 202 or the communication processor 40. If the communication processor 40 is waiting for data from the line group, the selector 203 will connect the B signaling bit into the communication processor. The message is shifted via bus 260 into the CP receiver 207 and connected to the CPU 209 for transmission to the base switch system controller 50. In order to transmit data from the processor 40 to a particular line group, data is loaded from the system controller to the CPU 209, loaded into the CP transmitter 208 and gated out through MUX 203 into buffer 201 and to the line group 41 at the appropriate time.

Referring to FIG. 4, the transmitter 208 of FIG. 3 is shown in more detail. The message to be transmitted to a particular subscriber switch is loaded into shift registers 212, 213, 214, via the data bus 215 from the CPU 209 of FIG. 3. The writing of the messages into shift registers 212-214 is controlled by a typical write decode circuit 216 (LS138), which is loaded with control signals from the CPU.

The CPU also loads address register 217 with a 6 bit address in which the two high-order bits identify the particular line group and four low-order bits identify to which of 16 T-1 lines in a line group the message is to be transmitted. The 2 high-order bits on bus 273 address decoder circuit 218 (LS155), which appropriately connects the message to the particular line group on one of buses 275.

Comparator 219 is continuously comparing addresses DP1-DP8 on bus 267, which provide up to 16 T1 addresses per line group, with the address from address register 217, and when they are equal comparator 219 informs via bus 223 transmit controller 222, a typical logic circuit for enabling the shift registers 212-214 and decoder 218. The data is then output from registers 212–214 and decoder 218 to the appropriate MUX 203 (one LS157 per line group) via bus 275. MUX 203 is enabled by the appropriate signals F2 on bus 266 and the signal on bus 269 from the channel selector 205 of FIG. 3. MUX 203 receives signaling bits on bus 57-3 from DPRS 202 of FIG. 3, and depending upon whether a message is to be sent from the CP, the MUX 203 is appropriately enabled to send a message out to the buffer from the 1Y output on bus 57-2.

The other inputs to the MUX 203 are the 3A input on bus 278, which is a hard-wired "1" to indicate no message; signaling bits from the DPRS 202 into the 1A connection, which are switched out to the buffer through the 1Y connection; data on bus 57-1 from the buffer 201 into the 3B connection and switched out through the 3Y connection on bus 260-1 to the receiver 207.

The transmitter circuit 208 also puts a "busy" bit into busy register 226, which will retain that "busy" state for transmission purposes until reset by the transmit controller 222 (under control of the CPU 209). Thus, the transmitter is only transmitting one message at a time to a particular line group.

Referring to FIG. 5, the CP receiver 207 is shown in more detail. In order to receive messages from a line group, the data occurring during the "B" signaling bit time is gated from the selector 203 of FIG. 3 to latch 230 of FIG. 5. The receiver 207 may receive up to four different messages, one per line group. The data received is input via bus 282 into a message memory 231, a 1K×4 bit memory for storing messages, and detect memory 232, a 4×16 bit memory for storing the first bit of each of the 64 T-1 lines incoming into the line groups. In order to detect the presence of an incoming message, the first bit of the B signaling bits on the 64 T-1 lines is set to "1" when there is no message, and the first bit on a particular T-1 line is set to a "0" when a message is present, which is then stored in the memory 232, as addressed by address lines DP1–DP8 on bus 267. The presence of the message is input to message flag store circuit 233, in which the set or flag bit is input on bus 295-1 through OR gate 234, AND gate 235 to flag store 236, a 4×16 bit memory for storing the message flag bit for each of the 64 T-1 lines. The gating logic 234, 235, 247 is duplicated for each line group, but is shown for simplicity for one line group.

The flag memory 236 stores the message flag bit and is addressed either by addresses DP1–DP8 or the address from the scan address register 241. The respective addresses are selected by selector 243 through the occurrence of signal F1 on bus 265 which is identifying the framing cycle along with clock F2 during the multiframe format, as previously described. When a message flag bit is detected, the information is sent to the CPU 209 through latches 247, 248 and bus 215. The CPU 209 sequentially scans the 64 T-1 lines by loading the scan address register 241 with four bits for identifying a particular set of 4 T-1 lines (one from each line group). Also, a message flag bit state is gated back to memory 231 on bus 284 to prevent overwriting messages in memory 231.

The CPU reads a message stored in message memory 231 by loading receive address register 240 with the proper address. Four bit address comparator 249, which also receives address DP1–DP8 on bus 267, enables receive controller 250, a typical logic circuit, at the appropriate address time. Two bits from register 240 address MUX 237 for selecting the appropriate line group. Receive controller 250 then enables the three shift registers 256–258 at the proper time for loading the data from message memory 231 onto the 8-bit data bus 215 to the CPU 209.

The flag bit from message detect memory 232 is also input to an overrun circuit 251 (identical to circuit 253) which enables the system to store additional message bits in the event that one message happens to overrun another.

The scan controller 252 enables latch 248 at the appropriate time for sending the message detect flag bits to the CPU. The write controller 253 enables the data to be written into latch 247 and corresponding latches in the overrun circuit 251 during the first 16 channel times of the multiframe format, which is the time in which the message flag bits occur.

The F1 and F2 signals on buses 265, 266 are ANDed with the DPRS clock signal on bus 267, which when ANDed with the occurrence of the message bit signal from flag store 236 on bus 285 enable the data to be written into message memory 231.

The reset decode circuit 254 (LS155) provides appropriate resetting of the message bits under control of the CPU 209.

The scan controller 252 and receive controller 250 also connect "busy" bits via buses 280, 281 to the busy register 226 of FIG. 4 to indicate that a scan or receive cycle is currently in operation, and is reset upon control completion.

The receive and scanning cycles are briefly described as follows. The B bits are loaded into memory 231 and 232 during frames 7–11 of the multiframe format. During frame 12, the data is shifted from memory 232 to flag store 236 and to the overrun circuit 251. Scanning takes place during frames 1–5, in which the CPU 209 is loading a scan address into scan address register 241. The scanning process is looking for a flag bit in memory 236.

Data is stored during frame 12 at the appropriate addresses generated by DPRS clock 1–16. The scanning addresses are loaded into register 241 and selected by selector 243. The read or receiving cycle is also performed during frames 1–5 by addressing memory 231 by DP1–DP256 on bus 267. The data from message memory 231 is loaded into shift registers 256, 257, 258 and connected to the CPU data bus 215.

FIG. 7—Local Subscriber Switch

Referring now to FIG. 7, a block diagram of a local subscriber switch 20 of FIG. 1 is shown. The local subscriber switch includes subscriber switch controller (SSC) 100 and 101, where each SSC is identical in configuration and therefore for simplicity only SSC 100 will be described. Each SSC is connected to a T-1 line such as line 22 or 23, which correspond to those shown in FIG. 1. The SSC's independently scan each subscriber terminal (ST) for line seizures, transmit and receive messages to and from the base switch 10, interface the connecting T-1 lines 22, 23 and connect/disconnect lines to the base switch.

Each SSC includes a central processing unit (CPU) 102, T-1 interface 103, clock generator 104 (each of which are cross latched to the alternate SSC by bus 105). Also included is an SSC is an ST interface 106, which interconnects to each of the subscriber terminals 10, each of which in turn connects to up to 24 subscriber lines. In one embodiment, the subscriber terminals 10 concentrate a total of 336 subscriber lines to any time slot on either of T-1 lines 22, 23. Other variations, of course, are possible. For example, a system could be utilized in which 16 subscriber terminals concentrate 384 subscriber lines to the two T-1 lines 22, 23.

The buses connecting each subscriber terminal 10 to an ST interface 106 are as follows. Each subscriber terminal 10 connects to command buses 112, which are two serial data buses, RCV command bus 112-1 and XMT command bus 112-2. The RCV command bus carries command signals from an SSC to an ST and the XMT command bus returns command signals to an SSC. Similarly, data buses 113 are two serial buses similar to that of the command buses—a RCV data bus 113-1 and XMT data bus 113-2. The command and data buses are 48 time slot buses, the format of which will be described below.

These buses are redundant, one set of four for each SSC. They are independent and the failure of one will not affect the other.

The data rate is 3.088 Mhz for each of the four buses and there are 48 time-slots with 8 bits of data per time-slot.

In one embodiment, alternate time-slots are used for calls going to the base switch 10. The SSC's are able to extract data from the alternative time-slots and output it on the T-1 lines 22 or 23 without having to buffer a frame's worth of data. Two of the remaining time slots are used for communications between the SSC's 100, 101 and the ST's 10. The remaining time slots are utilized for interconnecting the local subscriber lines in a remote subscriber switch such as RSS 21 of FIG. 1. Even time-slots (0, 2, ... 46) are used for the channels to the base switch and the odd time-slots 23 and 47 used for the control channels. The remaining odd time-slots (1, 3, ... 21, 25 ... 45) are used in a remote subscriber switch.

Individual select lines are used to enable a specific ST. The data and command buses such as 113, 112 are common to all ST's. The select lines designate which ST will receive and transmit on the data and command buses at any given time slot.

A clock generator 104 is associated with each SSC. They derive their timing independently from their associated T-1 line. Only one clock generator is used at any one time to drive both SSC's and all the ST's. This means the subscriber switch is run synchronously. If a failure is detected in one clock, it will be taken out of service and the other one will be activated.

A 3.088 Mhz clock, a frame sync (FS) pulse, and signaling frame (F6/12) pulses are included in the clock buses 114 from each SSC.

The subscriber switch control functions are performed by the SSC's. Under the command of the base swtich 10, a microprocessor in each SSC directs all the functions related to the associated T-1 line 22 or 23. Each SSC 100, 101 has access to all the subscriber terminals (ST) 10 via its own data and control buses. It interfaces to its associated T-1 line 22, 23 and extracts timing from it for clock generation.

An SSC 100, 101 scans the ST's 10 for subscriber loop status and for the ST status (errors or alarms). If any changes are detected, a message is formulated and transmitted to the base switch (BS) 10. The BS 10 will respond with messages such as to set up or drop paths and apply ringing.

As previously described, the communication link to the base switch is over the associated T-1 line. The "B" signaling bits of the T-1 line are used to formulate a 24 bit message, which gives a 16 KB/S channel. The data rate will not be this high since when the SSC transmits a message, it will wait for a response before it sends another message.

The major functions the basic SSC is to perform are: T-1 interface, communication link, ST control, clock generation, and attenuation pad.

The T-1 interface 103 converts the bipolar PCM data from the receive line 22-1 to TTL signals. A clock recovery circuit extracts clocks for clocking the data and for the clock generation circuit. For each eight bits of data, a parity bit is generated and is inserted into the associated control byte. The data bits are put on the RCV data bus 113-1 along with the associated control byte on the RCV CMD bus 112-1 at the even time slots.

If the time-slot is marked to require an attenuation pad, the eight data bits received from the T-1 line 22-1 are used to select from a PROM an output which is down in amplitude by the correct number of DB's. Thus, a digital attenuation pad can be inserted in the data stream of any channel from the base switch 10. When the base switch 10 determines that a pad is necessary, it will issue a command to the SCC 100 or 101, instructing it to insert a pad of the correct value. The T-1 interface 103 then substitutes the output of a PROM for the data as it passes through.

The SSC also functions to put data on the control bus and to scan the status of each terminal. There is a 48 word by 16 bit memory where each word is associated with one of the time-slots. The bits are partitioned as follows:

| | |
|---|---|
| 4 bits | ST address |
| 5 bits | terminal channel address |
| 3 bits | pad |
| 1 bit | assigned flag |
| 1 bit | path test |
| 1 bit | reading |
| 1 bit | parity |

To assign a time-slot, the SSC loads the location for that time-slot with the proper address and sets the assigned bit. Prior to the beginning of each time-slot, the memory is read and the ST address is decoded to enable the specified ST. The ST channel address and the data parity bit are loaded into a buffer to be shifted out onto the RCV CMD bus.

Scanning of the channels could be achieved by either software or hardware control. Under software control, the processor loads a two byte command and then the command is shifted out to the appropriate subscriber terminal in the next control time slot (23 or 47).

In a hardware approach, the SSC scans one channel at a time where the scanning sequence is to scan the same channel in all 14 ST's and then advance to the next ST channel. The two SSC's scan in opposite directions; one by increasing addresses and the other by decreasing addresses.

A nine bit counter generates the scan address and during the control time-slots, four bits of the scan address are decoded to enable one ST while the other five bits become the channel address that is shifted out onto the control bus. The scan command is shifted out with the channel address. This scanning is an automatic hard-wired process that can be superseded by the processor when it loads a command register. This command register will be put onto the control bus in place of the normal scan command.

The processor 102 will be interrupted when the scan result is received. The processor 102 is always interrupted if it initiated the command. When a command is sent out, the ST returns data over the data and command lines 112, 113. The commands are reflected or regenerated by the ST so that the processor 102 can check what the ST received.

The system clocks are generated from a voltage controlled oscillator clock generator 104 whose output is divided down and phase compared with the clock signal derived from the associated T-1 line which has also been divided down. The result of the comparison is used to modify the oscillator's frequency such that the average frequency of the two is the same. This base frequency is used to regenerate the system clock (3.088 Mhz), the frame sync (FS) and the signaling frame (F6/12) pulses.

The clock generator will also check the synchronization of a T-1 line 22. In general, three or more frame bits are missed in seven frames, a reframe routine will be invoked. The reframe routine is implemented in the processor program.

Error checking circuits monitor the absence of the clock derived from the T-1 line and monitor the frame sync and signaling frame pulses. When errors are made, the failed clock is taken out of service. The clock enable signals from the two SSC's are cross-latched such that only one clock generator is activate at any one time.

The subscriber terminal 10 is a 24 channel terminal with a common codec.

The ST contains a memory that is organized with four 10-bit words per channel. The words are identified as follows: (1) receive data, (2) transmit data, (3) receive status, and (4) transmit status.

The memory functions so that any channel or subscriber loop can be connected to any of the 48 timeslots.

The receive status word contains bits for path test enable and for the signaling states to be transferred to the LIU's. There are three signalling bits to give eight states that can be sent to each line.

The transmit status word contains the "A" and "B" bits to be transmitted to the SSC 100 or 101 and the base switch 10. There is a bit designated for the transmit status which is set when the SSC first reads an off-hook. This flags that channel so that the other SSC will ignore the seizure. This status bit may also be set by one SSC if it wants the other SSC to ignore any activity on a particular channel.

A path test consists of echoing the data sent to the ST. When a path test is to be performed, the SSC will set the path enable bit in the ST. This will cause the ST 10 to put any data received on bus 113-1 back out on the transmit data bus 113-2. The SSC 100 sends a specific bit pattern and checks if that same pattern is returned.

Another method of performing a path test is to open the loop on the line side of the ST and then send data towards the ST. The data is converted to analog, reflected by the ST and converted back to digital and sent towards the SSC. This checks everything except the loop.

Figures 8-11 Subscriber Switch Controller

Referring to FIG. 8, the data on T-1 line 22-1 from base switch 10 is input to a level converter 116 where it is converted to normal TTL levels and connected via bus 154 to elastic store 117, which is a 256 bit RAM, into which data is written and read under control of read-write control circuit 118, which includes conventional 9-bit counters (LS 393) and selectors (LS 137) for addressing the appropriate location in store 117.

The data from store 117 is output on bus 124 to the ST interface 106 of FIG. 7 for connection to the subscriber terminals. If data is in the form of a message from the communication processor in the base switch, it is stored in the data link message register 119 where it is connected on bus 111 to the central processing unit (CPU) 102 of FIG. 7.

Data from converter 116 is also input into clock circuit 104 via clock recovery circuit 183 and bus 184 where through conventional recovery techniques the typical clocking signals, F6/12 (frame 6 and 12), an active signal, and an ST clock (3.088 Mhz) signal are generated. The clock generator 104 also generates the system time slot address signals (TS1-48) in counter circuit 179, which also generates the FS (frame synchronization) on bus 187. The clock circuit also generates the framing bit signal on bus 164 for connection to the base switch. The clocking signals are shown in FIG. 14.

The corresponding clock signals from the alternate SSC are cross latched in select circuit 121 which allow for selection in selector 121 of only one clock signal. The clock signal is a 3.088 Mhz signal which enables the read write control circuit 118 to write data into elastic store 117. The counter circuit 179 also generates the RDM signal on bus 180 to enable the control circuit 118 to read data out of store 117.

The data from store 117 is also input with the F6/12 signal to a frame data register 122, which is controlled by a processor algorithm to enable the system to detect the signaling bit for each frame in a multiframe format. Eight bits at a time are loaded into register 122, which are examined by the processor algorithm to search for the proper framing code, as previously described. If a framing error is detected, the processor will instruct the control register 123 to either stop or advance via bus 181 the reading counter in control circuit 118 so as to "search" for the proper framing code. The control register 123 thus appropriately stops or advances the count in the read address counter within control 118 as instructed by the processor.

A command time slot decoder 186 receives from counter 179 via bus 189 control signals to generate the time slot 23 and 47 control signals on bus 188, which as previously described are the control time slots.

Referring to FIG. 9, the data from the T1 interface is input on bus 124 to signaling bit supressor 155 and to register 126, where that data either addresses an attenuation PROM 127 or is input to multiplexer 128. The signaling bits on bus 114 are suppressed in suppressor 155 during the signaling frames.

The attenuation PROM 127 is addressable by the 8 bit data from register 126 and is utilized for providing necessary attenuation in decibels (e.g., −2, 4, 6 DB's), when the system processor decides that attenuation is necessary. In one embodiment, there are 8 possible attenuation states which are appropriately selected by the system.

The path test register 129 stores data from the processor on bus 123 for performing a testing function for a subscriber path.

The scan data register 130 and scan command register 131 are utilized for scanning the status of the subscriber terminals. Each SSC performs a sequential scanning of particular channels in the subscriber terminals by utilizing two of the forty-eight time slots (voice control time slots 23 and 47). In one embodiment, one SSC scans from increasing addresses and the alternate SSC scans in decreasing address locations. Voice control register 132 receives the voice control data on bus 175, the format of which will be described in conjunction with the description of the subscriber terminal of FIG. 12.

Multiplexers 128, 133 multiplex the appropriate input signals onto buses 168, 169 for connection to drivers 134, 135, respectively, for connection to the receive data bus 113-1 and the receive command bus 112-1.

A receiver off-hook tone is stored in PROM 135 for synthesizing a receiver off-hook tone, which when appropriately enabled will be transmitted by the SSC to a receive data bus 113-1 to a designated subscriber terminal for instances when a particular subscriber has gone off-hook for a certain period of time.

The control of multiplexers 128, 133 is from the assignment memory on buses 167, 163, which is shown in more detail in FIG. 10.

Referring to FIG. 10, the assignment memory includes a 48×16 bit RAM 135 which stores the necessary data to enable functioning by the SSC. As there are 48 time slots on the buses to the subscriber terminals, the 48 addresses correspond to each time slot and store 16 bits. The first five bits identify which of the 24 subscriber lines in a subscriber terminal are to be identified, the next four bits identify the particular subscriber terminal (one of fourteen), three bits are used for attenuation (PAD), one bit for an assignment flag (this identifies that a time slot is assigned), one bit for path test, one bit for reading, and one bit for parity. The 16 bits are output cyclically from the processor on bus 123 to the input data register 136, where they are written into memory 135 via bus 171 at the location specified through address register 137, which is used for addressing memory 135 via bus 172, through multiplexer 138, at the specified location in the assignment memory 135. Writing of the data into memory 135 is through typical write control circuit 139, which is enabled by a write bit from address register 137. The reading of assignment memory 135 is normally through system time slot addresses on bus 114, which is generated from the clock generator 104 from FIG. 8.

Data from the memory 135 is read via bus 175 at the appropriate time into control register 139 and into read data register data 140 under control of processor read control 141. The bus 175 also connects to the voice control register 132 of FIG. 9.

Also, four bits on bus 170 for enabling a particular subscriber terminal are input from register 139 to decoder 143, which will then enable the designated subscriber terminal via bus 182. Multiplexer 192 receives data from register 139 via bus 170, the control time slot signals 23 and 47 on bus 188, and the appropriate subscriber terminal number on bus 191 from buffer 190, which was loaded by the processor.

Referring now to FIG. 11, data on bus 108-2 from a subscriber terminal is input to one of two registers 144, 145 which are the data read register 144 and scan data register 145. The scan data register 145 is receiving scanning information from a subscriber terminal only during control time slots 24 and 47. The data read register 144 is receiving data for connection to the processor during any other of the time slots. Data from a subscriber terminal is also put to multiplexer 146 for connection to holding register 147 and transmit register 148, from which the data is converted in level converter 149 for connection to output T-1 line 22-2 for transmission to the base switch 10. Holding register 147 also receives the framing bit signal on bus 164 from FIG. 8. During frame 6, the signaling bit is suppressed for all unassigned time slots in MUX 146 under control of the F6/12 signal, which identifies the signaling frames. During frame 12, if a message is to be sent to the base switch, it is input through multiplexer 146 from message register 142, which has been loaded with a message from the SSC processor.

XMT command data from a subscriber terminal is input on command bus 112-2 into scan command register 151 for connection to the processor. Also, error comparison for a scan command is checked with the data from the ST in comparator 152. The last four bits of data from the ST identifying a subscriber terminal is compared with stored ST data from the processor in comparator 153 for error checking.

FIG. 12—Subscriber Terminal

A functional description for a subscriber terminal is as follows. Each ST must communicate with two SSC's (SSC $\phi$ and SSC 1). Two types of information are passed between the SSC and ST on four serial buses defined as follows:

RCV DATA: Control and voice data from SSC to ST

RCV COMMAND: Command information from SSC to ST

XMT DATA: Control and voice data from ST to SSC

XMT COMMAND: Command echo from ST to SSC

RCV information leads XMT information by two time slots to allow timing for processing. If a particular ST is to process information, the enable line to that ST must be made active between the appropriate RCV and XMT time slot.

A 3 Mhz clock, frame sync pulse, and signaling frame pulse are passed to each ST from each SSC. Information is clocked from the buses to the ST on negative transitions of the 3 MHz clock, while information is clocked to the buses on positive transitions.

In FIG. 14, the frame sync pulse occurs between the end of time slot 47 and the beginning of time slot $\phi$ on the XMT bus. It is used to set internal counters to the correct state with respect to the buses. The signaling frame pulse is used to insert signal bits in XMT data during frames 6 and 12.

The format for the data and command buses are as follows.

TABLE I

| | | (SSC TO ST) | | |
|---|---|---|---|---|
| STATES | | RCV COMMAND | | RCV DATA |
| | MSB | | LSB | |
| 0. Scan Alarms | $\phi$ $\phi$ $\phi$ $\phi$ $\phi$ $\phi$ $\phi$ | | $\phi$ | X X X X X X X R |
| 1. Spare | $\phi$ $\phi$ $\phi$ $\phi$ $\phi$ $\phi$ $\phi$ | | 1 | X X X X SPARE |
| 2. Scan RCV | | CH # | $\phi$ 1 $\phi$ | X X X X X X X |

TABLE I-continued

| | Status | | | | | | | | | | | | |
|---|---|---|---|---|---|---|---|---|---|---|---|---|
| 3. | Update RCV Status | CH # | | $\phi$ | 1 | 1 | X X X X | T | $C_2$ | $C_1$ | $C_0$ | |
| 4. | Scan XMT Status | CH # | | 1 | $\phi$ | $\phi$ | X X X X | X | X | X | 1 | |
| 5. | Update XMT Status | CH # | | 1 | $\phi$ | 1 | X X X X | | SPARE | | S | |
| 6. | Voice | CH # | | 1 | 1 | [$\phi$/1] | B1 B2 B3 B4 B5 B6 B7 B8 | | | | | |
| 7. | Voice | CH # | | 1 | 1 | [$\phi$/1] | B1 B2 B3 B4 B5 B6 B7 B8 | | | | | |
| | | | | | | PARITY ↑ RCV VOICE | | | | | | |

(ST TO SSC)

| | STATES | XMT COMMAND | | | | | | | | XMT DATA | | | |
|---|---|---|---|---|---|---|---|---|---|---|---|---|---|
| 0. | Scan Alarms | $\phi$ | $\phi$ | $\phi$ | $\phi$ | $\phi$ | $\phi$ | $\phi$ | $\phi$ | ST # | ALARMS | | |
| 1. | Spare | $\phi$ | $\phi$ | $\phi$ | $\phi$ | $\phi$ | $\phi$ | $\phi$ | 1 | ST # | SPARE | | |
| 2. | Scan RCV Status | CH # | | | | $\phi$ | 1 | $\phi$ | | ST # | T | $C_2$ | $C_1$ | $C_2$ |
| 3. | Update RCV Status | CH # | | | | $\phi$ | 1 | 1 | | St # | T | $C_2$ | $C_1$ | $C_0$ |
| 4. | Scan XMT Status | CH # | | | | 1 | $\phi$ | $\phi$ | | ST # | B | A | S | |
| 5. | Update XMT Status | CH # | | | | 1 | $\phi$ | 1 | | ST # | B | A | S | |
| 6. | Voice | CH # | | | | 1 | 1 | [$\phi$/1] | | B1 B2 B3 B4 B5 B6 B7 B8 | | | |
| 7. | Voice | CH # | | | | 1 | 1 | [$\phi$/1] | | B1 B2 B3 B4 B5 B6 B7 B8 | | | |
| | | | | | | PARITY ↑ XMT VOICE | | | | | | | |

The SSC's use time slots 23 and 47 for control functions. All other time slots are used for voice functions. The RCV COMMAND bus is used to execute both control and voice functions. In Table I, the three LSB's contain the command to be executed. States $\phi$ through 5 are control commands and states 6 and 7 are voice commands. The five MSB's contain the channel unit number (when needed) to be processed.

On voice functions the command code will be either a 6 or 7 depending on the parity associated with the data byte. The RCV DATA byte is stored in memory (with parity) at the address defined by the 5 MSB's of the RCV COMMAND byte. The XMT DATA byte is retrieved from the same memory location and returned to the SSC that initiated the voice command. At the same time the XMT COMMAND byte is returned to the SSC. The XMT COMMAND byte is identical to the RCV COMMAND byte except for a possible parity difference. The information for the XMT COMMAND byte is obtained from an internal point such that as much circuitry as possible is checked.

Control functions are processed in similar fashion except there may or may not be a RCV DATA byte to be processed. This is indicated by the command code. In any case, the XMT COMMAND byte is composed of 4 bits representing the ST number and the 4 bits of memory that are of interest to the SSC. This provides a means of identification to the SSC. In general, an SSC will either be scanning or updating the ST memory. When updating, the memory bits returned to the SSC will always be the new memory bits.

The subscriber terminals each include 96×10 bit memory 316 formed by MOS static RAMS, which were employed because of lowest cost, lowest power consumption, and minimum space requirements.

Each time slot consists of eight 324 ns bit times. Processing intervals are divided up as follows:

| Bit Time | Memory Operation |
|---|---|
| 4–5 | Exchange data bytes with bus $\phi$ |
| 6–7 | Exchange data bytes with bus 1 |
| 0–3 | Even time slots: Exchange voice bytes with channel unit encoder and decoder. |
| 0–3 | Odd time slots: Exchange status bytes with channel units. |

These memories are just fast enough to execute a read-modify-write cycle in 648 ns.

For ease of handling, the status parity bit has been moved from the bit 8 position to the bit 7 position in memory.

Each subscriber line is allocated four words in memory or channel units. Words 1 and 2 are for RCV and XMT voice data. Words 3 and 4 are for RCV and XMT status data.

During odd time slots, the RCV status bits are loaded into a corresponding channel unit (CU) buffer. In Table I, the "T" bit is allowed to control the selection of the XMT voice byte. Thus, when a path test is enabled, the "T" selects voice bytes from the input to the D to A (decoder) circuit instead of the A to D (encoder) circuit output. A closed loop voice path is established for that channel unit allowing loop testing of voice bits. The path test will continue until disabled by the SSC.

In Table I, $C_0$, $C_1$, and $C_2$ represent 1 out of 8 possible actions to be executed at the channel unit. One of these is a "do nothing" state while the other seven are selected for the individual needs of the various types of channel units (e.g., ringing, test). During odd time slots, this data is stored in the appropriate channel unit. Thus the channel units are each updated once per frame to keep "fresh" data in the channel unit registers.

Channel units are scanned for the state of the outgoing A and B bits at the same time that the RCV signaling is stored. The memory is updated with the current A and B status. Whenever an off hook occurs, the A bit changes from a $\phi$ to a 1. The next scan by an SSC causes the S bit to be set to a 1, thus marking the fact that an off hook has been detected by an SSC. The SSC subsequently sets the S bit back to zero when the call is complete.

During frame 6 and 12, A and B bits (respectively), are inserted in the B8 position of XMT voice data.

Referring to FIG. 12, a plurality of subscriber telephone lines 14-1 to 14-24 are connected to line interface units (LIU) 301. Each LIU unit 301 is a well known unit for converting analog signals on the telephone subscriber lines to a pulse amplitude modulated (PAM) format and inputs the PAM data into a codec 302. The LIU 301 units also receive PAM signals from a codec 302 for converting to analog format and connection to the respective subscriber line.

Referring to FIG. 13, a block diagram for a line interface unit is shown in which the subscribers tip and ring lines 14 are input to a hybrid junction circuit 303 and balance network 304, which achieve a desired balancing effect by the transmission of the signal through the transmit and receive filters 305, 306, respectively, and converting a subscriber's analog signal into a pulse amplitude modulated (PAM) format. The receive filter 306 is appropriately balanced so that undesired signals are not transmitted down the receive bus 347. The hybrid junction 303 includes a relay contact which detects the dial pulses from a subscriber line using conventional rotary techniques. The LIU also includes logic circuitry 307 for manipulating the A & B signaling bits through techniques well known in the art to inform the system of a subscriber going off hook and detection of dial pulses. The system will accordingly instruct a line interface unit 302 to activate the necessary ringing functions by appropriate control signals.

Referring again to FIG. 12, the PAM data from line interface units 301 are multiplexed into codec 302 via buses 345 or 348. Each codec includes a digital to analog converter such as Precision Monolithics DAC-76 or Signetics ST-100, which are $\mu$-255 law companding converters with appropriate logic circuitry for converting data between PAM and PCM format. Each codec 302 handles up to 12 channels for encoding and decoding and making a full A/D conversion every 10.4 microseconds. The codec 302-1, 302-2 in each subscriber terminal multiplex the 24 subscriber lines 14-1 to 14-24 into PCM format for connection onto a 8-bit bi-directional data bus 313. Similarly, the codec 302-1, 302-2 receive PCM data via 8-bit data bus 314.

The data on bus 313 is input to a read-modify write circuit 315, which includes conventional selector circuits (LS 253). The circuit 315 is connected to the 96×10 bit memory 316 for appropriately storing the data corresponding to the subscriber lines 14.

The timing diagram for a subscriber terminal is shown in FIG. 14, in which the command and data buses are 48 time slots (0–47) buses and in which the receive data (SSC to ST) leads the transmit data (ST to SSC) by two time slots. The system is controlled by a system master clock of 3.088 Mhz, operative in a multiframe format of 12 frames, where signaling frames occur during the sixth and twelfth frames, as previously described. In FIG. 14, the expanded time slot signals are shown occurring at the end of frame 5 and the beginning of frame 6. The receive data leads the transmit data by two time slots in order to allow the subscriber terminal to receive the data, process it, and transmit it in successive time slots.

Data to be transmitted to either a Codec 302 or an SSC is read out of memory 316 to Data buses 314 or 317. Similarly, data to be written into memory 316 from either codec 302 or an SSC is input via buses 313 or 318 through read-modify write circuit 315. The A and B signaling bits from the LIU's 301 are input to circuit 315 on bus 363. The signaling bits are to be connected to the LIU's 301 and are connected from buffer 337 via bus 365 to RSB decode circuit 362 (typically LS 319) and to the LIU's 301 via bus 364. In FIG. 12, the particular buses from an SSC are described as follows. The transmit data bus 113-2 and receive data bus 113-1 correspond to bus 113 of FIG. 7. Similarly, buses 108-2, 108-1; 112-2, 112-1; and 109-2, 109-1 correspond to the respective buses in FIG. 7.

Serial data from an SSC such as SSC-0 on bus 113-1 is converted to 8 bit format on bus 318 and input to memory 316 through circuit 315 and bus 319.

The memory 316 into which data is to be written is addressed during a receive cycle by the RCV command data on bus 112-1 or 109-1, which is input through register 326 onto buses 353, 330, where the bus format in Table I uses the 5 higher-order bits to address memory 316, which corresponds to the appropriate channel number. The data on data bus 319 is then written into memory 316 at the location corresponding to the appropriate subscriber line 14. When counter 331 counts to the time slot corresponding to the appropriate subscriber line, it addresses memory 316 and the data is then read on bus 314 for connection through codec 302 and a line interface unit 301 to the appropriate subscriber line.

During a transmission cycle from an ST to a particular SSC, the data from a codec 302 is input on bus 313 through circuit 315 to memory 316 in a location corresponding to the subscriber line (addressed by counter 331). The data is then read out of memory 315 onto bus 317 for connection to the appropriate SSC at the time addressed by the SSC.

It can be seen, therefore, that the subscriber terminal is capable of a time slot interchanger function by connecting the subscriber lines 1–24 to any of the time slots to either of the SSC's, as long as a time slot is available. The subscriber could be connected to either of the T-1 lines, 22, 23 of FIG. 7 without blocking, as long as those time slots were available.

The selector circuit 332 selects the clocking signals from the clock generators of both SSC's and performs conventional clock detecting and clock searching techniques to insure that a clock signal is provided to the subscriber terminal. Selector 332 provides the CLK, FS, and F6/12 signals on buses 338, 337, 358, respectively. The counter 331 is counting in response to the clock signals and is used for addressing in conjunction with control circuit 335.

The memory control circuit 335 utilizes three PROM's storing the data to provide appropriate enabling signals on buses 343, 344, 356, 359 for he subscriber terminal when addressed by counter 331 during the cycles of operation. The buffer 337 is utilized for updating the read-modify write circuit 315 under control of the SSC. For example, in order to update the state of the A and B bits, the old byte containing the A & B bits is routed through buffer 337 via bus 351 into circuit 315, which substitutes the new A & B bits from the LIU's into the appropriate bit positions and then writes the whole byte back into the selected location in memory 316.

FIGS. 15–17 Remote Subscriber Switch

Referring now to FIG. 15, a block diagram is shown of a remote subscriber switch such as switch 21 of FIG. 1, which is identical to a local subscriber switch except for the addition of a time slot interchanger (TSI) 71 connected to the transmit-receive command and data buses 112, 113 which connect to each subscriber terminal (ST) 10. Each subscriber switch controller (SSC) includes a TSI 71 for controlling intraconnections between subscriber terminals within the same subscriber switch. The TSI 71 is used in one embodiment for switching encoded data on 22 of the 48 time slots between local subscribers in the same subscriber switch. However, the TSI 71 is capable of switching data between all 48 of the time slots which connect the subscriber terminals 10. The TSI 71 is shown in more detail in FIG. 17.

Referring to FIG. 17, data from the subscriber terminals is input on a serial XMT DATA bus 113'-2, which corresponds to bus 113-2, as shown in FIG. 15. The serial data is clocked into an 8-bit shift register 401 where it is converted to parallel format and latched into input latch 402 on bus 430 together with parity on bus 431 from the serial XMT CMD bus 112'-2, which corresponds to bus 112-2, as shown in FIG. 15, from which parity is latched into latch 404.

I/O control and clock generator 421 generates the master clock (3.088 MHz), F6/12, and phase 1 ($\phi$)—phase 5 ($\phi$5) signals, the format of which are shown in FIG. 16. The clock generator receives the FS, F6/12, and CLK signals on bus 114 from the respective SSC.

Data from latch 402 is input on bus 432 to data memory 403, a 48×9 bit memory, where it is sequentially loaded during $\phi$4 from the corresponding time slots on the XMT data bus 113'-2. Data memory 403 is addressed by ADRS MUX 403, a selector circuit which selects appropriate time slot addresses from the SSC on bus 70 or from the controller latch 409 on bus 438.

The I/O controller 421 (a typical decoder such as LS138) receives appropriate control signals on bus 70 from the SSC for writing data into the control memory 407, a 48×16 bit memory, which stores the control data from the SSC. Control memory 407 is used for addressing the reading of data memory 403 at the appropriate time, as will be described.

The PAD ROM 412 stores in one embodiment data samples which, when addressed by the data on bus 434 from the output latch 410 and enabled by a PAD select signal from the function decoder 411 on bus 451, will attenuate the data by 2 decibels (dB).

The tone memory 415 is a 32K ROM for storing pulse code modulated samples representing dial tone, ring back tone, busy tone and high tone. The idle code generator 416 provides an appropriate fixed bit pattern signifying an idle code when enabled by the tone select signal on bus 447. When enabled by the function decoder 411, the tone memory 415 or generator 416 will connect the appropriate tones via bus 450 (a three-state bus) to shift register 418 and to RCV DATA bus 113-1. Function decoder 411 is a typical logic circuit for appropriately enabling parity check 413, PAD ROM 412, tone memory 415, idle tone generator 416 and shift registers 418, 419. Decoder 411 is controlled by control memory 417 via bus 440.

Address MUX 408 selects data from the time slot address bus 70, or from time slot register 422, which is loaded by the SSC. Control memory 407 as previously described stores the instructions which control the reading of data memory 403 at the appropriate time slot. Six bits are necessary from memory 407 via bus 441 in order to properly address memory 403. The six bits are loaded from time slot register 423 via bus 443 under control of the SSC. Also, five bits are used for loading control latch 414 which identifies the subscriber terminal channel number on bus 446. Control Register 424 loads control data into a portion of memory 407 via bus 444. Control memory read registers 426, 427 can be loaded with data from control memory 407 thereby enabling the system to check the operation of the control memory.

The data from the memory 403 is loaded through shift registers 418, 419 onto receive data bus 113-1 and receive command bus 112-1 for connection to the subscriber terminals.

In FIG. 16, the $\phi$1–$\phi$5 signals from the clock generator are as follows. $\phi$1 will latch the control memory 407 output. $\phi$2 latches XMT data into latch 402. $\phi$3 latches data memory 403 output. $\phi$4 allows writing of XMT data into memory 403. $\phi$5 allows loading of shift registers 418, 419. In one embodiment, data is first read from the data memory before writing new data in order to prevent writing over of old data in the memory.

As an example of operation of the TSI 71, assume that data from a subscriber line in time slot 2 on bus 113'-2 is to be connected to time slot 9 on the receive data bus 113-1 for connection to another subscriber line within the subscriber switch. Encoded data is loaded via bus 430 in parallel format into memory location 2 of memory 403, which corresponds to time slot 2 of the time slot bus 113-2. At this time the data memory is addressed during $\phi$4 by the time slot address on bus 114 from the SSC. Data is read out of memory location 2 during time slot 9, and memory 403 is addressed via control memory 441, control latch 409 and address mux 405. The control memory 407 has been loaded with this time slot address (time slot 9) by the SSC through register 423. The data from data memory 403 is then connected to time slot 9 on the receive data bus 113-1 during time slot 9 for connection to the appropriate subscriber terminal. Also, the ST channel number on bus 446 and parity on bus 449 is loaded onto the receive command bus 112-1.

If a tone is to be connected to a subscriber line via the tone memory 415, it is enabled by a tone select on bus 447. Tone memory 415 is addressed by 10-bit bus 453 from clock generator 421 for reading out the tone samples. If a PAD is to be effected on a time slot, a PAD select signal on bus 451 enables the PAD ROM 412 which attenuates the data accordingly.

For data coming from time slot 9, it is latched into data memory 403 at location 9, which when read during time slot 2 via control memory 407 will connect the data in time slot 9 to time slot 2, thereby completing the time slot interchanger function.

The TSI 71 therefore is a half-duplex time division switch relying upon the subscriber switch controller for control information.

In order to more clearly describe the operation of the system, a cycle of operation for connection of one subscriber line to another will be now explained.

Assume that a subscriber, such as subscriber S-12 goes off-hook and intends to make a call. The associated line interface unit 301-12 of FIG. 12 will detect the offhook condition and inform the read modify write circuit 315 which will then store this status in word location 3 (transmit status byte) of channel unit 12 in memory 316 (channel unit 12 corresponds to subscriber 12). Both of the SSC's are scanning for the status of the particular subscriber lines and within a short period of time one of the SSC's will instruct the subscriber terminal for subscriber 12 to return the status of subscriber line 12. At this time the SSC, say SSC $\phi$, will send a receive command during control time slots 23 or 47 to SCAN the status of subscriber line 12. The delayed time slots for the transmit response (two time slots) will enable the ST to inform the SSC that subscriber 12 has gone off hook by returning the updated transmit status byte. At this time, the S bit is set to a 1 thus marking the fact that an off hook has been detected by an SSC. The SSC will subsequently set the S bit back to $\phi$ when the call is complete.

When an SSC has been informed of the off-hook condition by the subscriber terminal, the information is loaded into the scan data register 145 of FIG. 10 and connected to the processor, and the SSC sends a message to the base switch 10 via the T-1 line 22-2 by loading the message register 142 shown in FIG. 11, which at the appropriate time connects the message to the T-1 line 22-2, which is then sent to the base switch 10. The base switch 10 will receive the signal via the communications processor 40, which has been described in FIGS. 3-6. When the base switch has been informed of the off-hook change, it will instruct the SSC, via the communication processor 40, to connect the subscriber line 12 to a time slot on T-1 line 22, say for example, time slot 20.

In FIG. 2, the system controller 50 will instruct the service generator 43 to connect dial tone to the assigned time slot on the T-1 line (time slot 20). The corresponding internal time slot between the ST and the SSC could be in one embodiment any even time slot, say, for example time slot 40. The SSC will then connect the subscriber line 12 to internal time slot 40 to make the interconnections for data going out to the base switch. When the service generator 23 connects the dial tone to subscriber 12, the data is in PCM format and will be connected to the subscriber terminal during the assigned time slot, which is in this instance time slot 40 and stored in memory 316 at the corresponding channel unit. In FIG. 12, the receive command bus such as bus 112-1 will address memory 316 via buses 353, 330 at the channel number location for indicating which command is to be executed. The receive data bus will carry the data into the memory 316 at that time. In order to connect the PCM data representing the dial tone to the subscriber 12, the counter 331 will address memory 316 during subscriber time slot 12 and connect, via buses 319 and 314, the data to codec 302-1 which converts the data to a pulse amplitude modulated (PAM) format and connects it to the line interface unit 301-12. The line interface unit 301-12 will convert the data through conventional techniques to an analog format and connect the dial tone to the subscriber line 12. The subscriber begins dialing and the dialing information is transmitted to the base switch 10 where a translation table is addressed with the dialing data in order to make the proper connections. Voice data during the assigned time slots will be occurring as described with the data being transmitted and received under the states 6 and 7 as described previously.

For a call to a subscriber line, the base switch 10 will be informed of such an incoming call and will instruct, through the communications processor 40, an SSC such as SSC $\phi$ to make connections between a desired subscriber line, if it is not busy, and the incoming call. The communications processor transmitter will send a message as previously described to the SSC to inform it of an incoming call. The SSC will instruct the appropriate subscriber terminal to ring the particular subscriber line, say subscriber line 1, and when the subscriber answers, connections are made for transmitting and receiving the calls between the calling and called parties in the form previously described.

What is claimed is:

1. An integrated telephone transmission system operating in a multiframe format where each frame consists of a plurality of time slots having a time slot rate, said system comprising:

a plurality of multitime-slot bidirectional data buses, base switch means connected to said data buses for specifying selected ones of said time slots and for switching data between the specified time slots, a plurality of subscriber lines, first and second subscriber switch means, each of said subscriber switch means connected to some of said subscriber lines and to a first pair of said bidirectional buses for encoding data on said subscriber lines, thereby forming first encoded data and for switching said first encoded data to specified ones of said time slots on either bus of said pair of buses, whereby said base switch means switches said first encoded data to specified time slots on said plurality of buses, said base switch means connected to receive second encoded data in other time slots on said plurality of buses for switching said second encoded data to other specified time slots on either of said pair of buses, said first and second subscriber switch means connected to receive said second encoded data for decoding said second encoded data and for switching the resulting decoded data to specified ones of said subscriber lines, said first subscriber switch means including means for encoding data on said subscriber lines thereby forming third encoded data, interchanger means having a plurality of channel unit locations corresponding to said subscriber lines, and means for switching said third encoded data between specified ones of said locations in said interchanger means, means for decoding said switched encoded data, and means for switching the decoded data resulting from the latter operation to specified ones of said subscriber lines.

2. A system as in claim 1 wherein said subscriber switch means includes subscriber terminal means connected to said subscriber lines and to said pair of buses for encoding and decoding data between said subscriber lines and said pair of buses and subscriber switch controller means connected to said pair of data buses for controlling the switching of the encoded data between said encoding means and said specified time slots.

3. A system as in claim 2 wherein each of said terminal means includes means for multiplexing said first encoded data into a time frame corresponding to said multiframe format and means for demultiplexing said second encoded data in said format.

4. A system as in claim 3 wherein said subscriber terminal means includes a number of subscriber terminals each connected to some of said subscriber lines,
said controller means including means for enabling the switching of the encoded data between said encoding means and either of said pair of buses.

5. A system as in claim 4 wherein each of said terminals include codec means connected to the subscriber lines for encoding said signals into a pulse code modulated format,
a first multitime-slot bus,
memory means,
means connected to said first bus and to said memory means for writing said first encoded data into locations in said memory means corresponding to said subscriber lines,
a second multitime-slot bus,
means connected to said second bus for reading said first encoded data from the corresponding locations onto time slots on said second data bus corresponding to said specified time slots and
means for switching said first encoded data on said second bus to said specified time slots on either of said pair of buses.

6. A system as in claim 5 wherein said terminals include means for switching said second encoded data onto corresponding time slots on said second bus,
means for writing said second encoded data into locations in said memory means corresponding to said specified ones of said subscriber lines, said codec means including means for decoding and demultiplexing said second encoded data for switching the decoded data to said specified ones of said subscriber lines.

7. A system as in claim 6 wherein said terminals include memory control means for controlling the reading and writing of said encoded data into said memory means specified by said base switch means.

8. A system as in claim 7 wherein said controller means includes a pair of controllers each connected to one of said pair of buses, each controller including
a second pair of data buses each connected in common to each of said terminals for carrying the encoded data between said terminals and said controller,
means to generate transmit and receive control signals responsive to the time slots specified by said base switch means, and
a pair of command buses each connected in common to each of said terminals for carrying said transmit and receive control signals for enabling the switching of said encoded data between said encoding means and said specified time slots.

9. A system as in claim 8 wherein said controllers include interface means for connecting said pair of buses to said second pair of data buses and for switching said data and control signals between said terminals and said base switch means.

10. A system as in claim 1 wherein said base switch means includes communication processor means for transmitting a first message to said subscriber switch means on one of said first pair of buses for specifying the switching of said encoded data and for receiving on one of said first pair of buses a second message from said subscriber switch means for specifying said subscriber lines.

11. A system as in claim 10 wherein said communication processor means includes means for transmitting said first message during the signaling bits of alternate signaling frames of the multiframe format,
means for receiving said second message from said switch means during said signaling bits of an alternate signaling frame,
selector means for specifying said one of said first pair of buses, and processing means for controlling the operating of said communication processor means.

12. A telephone system, operating in a multi-frame format where each frame consists of a plurality of time slots, said system comprising
a plurality of multitime-slot bidirectional data buses,
base switch means connected to said bidirectional buses for specifying selected ones of said time slots and for switching data between the specified time slots,
a plurality of subscriber lines,
subscriber switch means connected to said subscriber lines and to a first pair of said bidirectional buses for encoding switching data on said subscriber lines, thereby forming first encoded data, and for switching said first encoded data to specified ones of said time slots on either of said pair of bidirectional buses, whereby said base switch means switches the encoded data to specified time slots on said plurality of buses,
said base switch means connected to receive second encoded data in other specified time slots on said plurality of buses for switching said second encoded data to specified time slots on said pair of buses,
said subscriber means connected to receive said second encoded data for decoding said second encoded data and for switching the resulting decoded data to specified ones of said subscriber lines,
said subscriber switch means including means for encoding data on said subscriber lines, thereby forming third encoded data, interchanger means having a plurality of channel unit locations corresponding to said subscriber lines and means for switching said third encoded data between specified ones of said locations in said interchanger means, means for decoding said switched encoded data, and means for switching the decoded data resulting from the latter operation to specified ones of said subscriber lines.

13. A system as in claim 12 wherein said subscriber switch means includes subscriber terminal means connected to said subscriber lines for encoding and multiplexing the data on said subscriber lines into a time frame corresponding to said multiframe format and
subscriber switch controller means connected to said first pair of buses for controlling the switching of the encoded data to said specified time slots.

14. A system as in claim 13 wherein said subscriber terminal means includes a number of subscriber terminals each connected to some of said subscriber lines,
said controller means including means for enabling the switching of said encoded data between said encoding means and said specified time slots on either of said pair of buses.

15. A system as in claim 13 wherein said means for encoding include codec means connected to the subscriber lines for encoding said data, thereby forming said first encoded data,
a first multitime-slot bus,
memory means having channel unit locations corresponding to said plurality of subscriber lines, means connected to said first bus and to said memory means for writing said first encoded data from said encoding means into channel unit locations in said memory means corresponding to said subscriber lines, a second multitime-slot bus, means connected to said second bus for reading said data from the corresponding locations onto time slots on said second bus corresponding to said specified time slots, and means for switching said encoded data on said second bus to said specified time slots on either of said pair of buses.

16. A system as in claim 15 wherein each of said subscriber terminals includes means for switching said second encoded data onto corresponding time slots on said second bus, means for writing said second encoded data into locations in said memory means corresponding to said subscriber lines, said codec means including means for decoding and demultiplexing said second encoded data and for switching the decoded data to said subscriber lines.

17. A system as in claim 16 wherein each of said subscriber terminals includes memory control means for controlling the reading and writing of said data into said channel units corresponding to the time slots specified by said base switch means.

18. A system as in claim 17 wherein said controller means include a pair of controllers, each of said controllers connected to a respective one of said first pair of buses, each controller including a second pair of data buses connected in common to each of said subscriber terminals for carrying the encoded data between said terminals and said controller, means for generating transmit and receive control signals responsive to the time slots specified by said base switch means, and a pair of command buses connected to each of said subscriber terminals for carrying said transmit and receive control signals and for enabling the switching of data between said subscriber lines and said specified time slots.

19. A system as in claim 18 wherein said controllers include interface means for connecting said first pair of buses to said second pair of data buses, and means for receiving and sending data and control signals between each of said subscriber terminals and said base switch means.

20. A system as in claim 12 wherein said base switch means includes communication processor means for transmitting on one of said first pair of buses a first message to said subscriber switch means, said first message specifying the switching of the data, and for receiving on one of said first pair of buses a second message from said subscriber switch means specifying said subscriber lines.

21. A system as in claim 20 wherein said communication processor means includes means for transmitting said first message during the signaling bits of alternate signaling frames of the multiframe format, means for receiving said second message from said switch means during said signaling bits of an alternate signaling frame, selector means for specifying said first pair of buses, and processing means for controlling the operation of said communication processor means.

22. A telephone system operating in a multiframe format where each frame consists of a plurality of time slots, comprising:

a plurality of multitime-slot bidirectional data buses, base switch means connected to said data buses for specifying said time slots and for switching data between the specified time slots, a plurality of subscriber lines, subscriber switch means connected to said subscriber lines and to a pair of said buses for encoding data on said subscriber lines, thereby forming first encoded data, and for switching said first encoded data to specified ones of said time slots on either of said pair of buses, whereby said base switch means switches said first encoded data to specified slots on said plurality of buses, said base switch means connected to receive second encoded data on said plurality of buses for switching said second encoded data to other specified time slots on either of said pair of buses, said subscriber switch means connected to receive said second encoded data for decoding said second encoded data and for switching the resulting decoded data to specified ones of said subscriber lines, said subscriber switch means including means for encoding data on said subscriber lines, thereby forming third encoded data, interchanger means having a plurality of channel unit locations corresponding to said subscriber lines and means for switching said third encoded data between specified ones of said locations in said interchanger means, means for decoding said third encoded data, and means for switching the decoded data resulting from the latter operation to specified ones of said subscriber lines.

23. An integrated telephone transmission and switching system, said system operating in a multiframe format where each frame consists of a plurality of time slots having a time slot rate, comprising:

a plurality of multitime-slot bidirectional data buses, base switch means connected to said plurality of data buses for specifying some of said time slots and for switching encoded data between the specified time slots, a plurality of subscriber lines, subscriber switch means connected to said subscriber lines and to a pair of said data buses for encoding data on said subscriber lines, thereby forming first encoded data, and for switching said first encoded data to specified ones of said time slots on either of said pair of buses, whereby said base switch means switches said first encoded data to specified time slots on said plurality of buses, said base switch means connected to receive second encoded data in other specified time slots on said plurality of buses for switching said second encoded data to other specified time slots on either of said pair of buses, said subscriber switch means connected to receive said second encoded data for decoding said second encoded data and for switching the resulting decoded data to said subscriber lines, said subscriber switch means including a number of subscriber terminals connected to some of said subscriber lines, each of said subscriber terminals including encoding means for encoding and multiplexing data from said subscriber lines into a pulse code modulated format corresponding to said multiframe format and for decoding and demultiplexing said second encoded data, subscriber switch controller means connected to said pair of data buses for controlling the switching of said encoded data between said encoding means in said terminals and said specified time slots, said controller means including means for enabling the switching of said first and second encoded data between said encoding means in said terminals and said pair of buses and means for switching data between specified ones of said subscriber lines, said subscriber terminals including means for encoding data on said subscriber lines, thereby forming third encoded data, said controller means including interchanger means having a plurality of channel unit locations corresponding to said subscriber lines and means for switching said third encoded data between specified ones of said locations in said interchanger means, means for decoding said switched encoded data, and means for enabling the switching of the decoded data resulting from the latter operation to specified ones of said subscriber lines.

24. In a telephone system operating in a multiframe format where each frame consists of a plurality of time slots, said system including a base switch connected to a plurality of multitime-slot bidirectional data buses for specifying some of the time slots on said buses and for switching encoded data in a format corresponding to the multiframe format between the specified time slots on any of said buses, a local subscriber switch comprising:

a plurality of subscriber lines, a number of subscriber terminals, each of said terminals connected to some of said subscriber lines and including means for encoding and multiplexing data from said subscriber lines into a format corresponding to said multiframe format, thereby forming first encoded data, and for decoding, demultiplexing and switching second encoded data in said format on specified ones of said time slots to said subscriber lines, subscriber switch controller means connected to a pair of said buses and to each of said terminals for enabling the switching of encoded data between said encoding means in said terminals and specified time slots on either of said pair of buses, said controller means including means for switching data between specified ones of said subscriber lines, said subscriber terminals including means for encoding data on said subscriber lines thereby forming third encoded data, said controller means including interchanger means having a plurality of channel unit locations corresponding to said subscriber lines and means for switching said third encoded data between specified ones of said locations in said interchanger means, means for decoding said switched encoded data and means for enabling the switching of the decoded data resulting from the latter operation between specified ones of said subscriber lines.

25. In a telephone system operating in a multi-frame format where each frame consists of a plurality of time slots, said system including a base switch connected to a plurality of multitime-slot bidirectional data buses for specifying some of the time slots on said buses and for switching encoded data between specified time slots on any of said buses, a local subscriber switch comprising:

a plurality of subscriber lines, a number of subscriber terminals, each of said terminals connected to some of said subscriber lines, said terminals including means for encoding and multiplexing data on said subscriber lines into a format corresponding to said multiframe format, thereby forming first encoded data, subscriber switch controller means connected to each of said terminals and to a pair of said buses for enabling the switching of said first encoded data between said encoding means in said terminals and specified time slots on either of said pair of buses, and for enabling the switching of second encoded data between said subscriber terminals, said controller means including, a pair of controllers, each of said controllers connected to one bus of said pair of buses, and including means for enabling the switching of data from specified ones of said subscriber lines to said specified time slots on said one bus, each controller connected to receive third encoded data on said one bus for switching said third encoded data to said subscriber terminals, said terminals including means for decoding and demultiplexing said third encoded data and means for switching the resulting decoded data to said specified ones of said subscriber lines.

26. In a telephone system operating in a multiframe format having time frames each consisting of a plurality of time slots, said system including a base switch connected to a plurality of multitimeslot bidirectional data buses for switching data between specified ones of the time slots on said buses, a subscriber switch connected to a pair of said buses comprising:

a plurality of local subscriber lines, subscriber terminal means connected to said subscriber lines including means for encoding and multiplexing data on said subscriber lines into a format corresponding to said multiframe format, thereby forming first encoded data, subscriber switch controller means connected to said terminal means and to said pair of buses for switching said first encoded data to specified ones of said time slots on either of said pair of buses, thereby switching said data from said encoding means to either of said pair of buses, said controller means including means for switching second encoded data in specified time slots on either of said pair of buses to said terminal means, said terminal means including means for decoding and demultiplexing said second encoded data and for switching the resulting decoded data to said subscriber lines, said controller means including means for switching data between specified ones of said subscriber lines, including means for encoding data on said subscriber lines, thereby forming third encoded data, interchanger means having a plurality of channel unit locations corresponding to said subscriber lines and means for switching said third encoded data between specified ones of said locations in said interchanger means, means for decoding said switched encoded data and means for switching the decoded data resulting from the latter operation to specified ones of said subscriber lines connected to said terminal means.

27. A subscriber switch as in claim 26 wherein said interchanger means includes a transmit and a receive data bus, data memory means connected to said transmit data bus for storing said third encoded data in locations corresponding to said specified time slots on said buses, means for writing said third encoded data into said locations, and means connected to said receive bus for reading the stored encoded data onto specified time slots on said receive data bus.

28. A subscriber switch as in claim 27 wherein said interchanger means include tone memory means having a number of storage locations for storing tone samples representing a service tone, and means for reading said tone samples onto specified time slots on said receive bus.

29. A subscriber switch as in claim 26 wherein said interchanger means includes attenuation means having a number of locations for storing attenuated encoded samples corresponding to the encoded data, whereby the encoded data addresses the attenuation means at the corresponding locations for reading out said attenuated encoded samples to said receive data bus.

30. An integrated telephone transmission and switching system operating in a multiframe format where each frame consists of a plurality of time slots having a time slot rate, said system comprising:

a plurality of multitime-slot bidirectional data buses, base switch means connected to said bidirectional data buses for specifying selected ones of said time slots and for switching encoded data between the specified time slots, a plurality of subscriber lines, first and second subscriber switch means, each of said subscriber switch means connected to some of said subscriber lines and to a pair of said bidirectional buses for encoding data on said subscriber lines, thereby forming first encoded data and for switching said first encoded data to specified ones of said time slots on either bus of said pair of buses, whereby said base switch means switches said first encoded data to other specified time slots on said plurality of buses, said base switch means connected to receive second encoded data in other time slots on said plurality of buses for switching said second encoded data to specified time slots on either of said pair of buses, said first and second subscriber switch means connected to receive said second encoded data for decoding said second encoded data and for switching the resulting decoded data to specified ones of said subscriber lines, said first subscriber switch means including means for encoding other data on said subscriber lines, thereby forming third encoded data, interchanger means having a plurality of channel unit locations corresponding to said subscriber lines and means for switching said third encoded data between specified ones of said locations in said interchanger means, means for decoding said third encoded data, and means for switching the decoded data resulting from the latter operation to specified ones of said subscriber lines, said second subscriber switch means connected to another multitime-slot data bus for switching fourth encoded data between said another bus and said pair of buses or between said another bus and said subscriber lines.

31. A telephone transmission and switching system operating in a multiframe format where each frame consists of a plurality of time slots having a time slot rate, said system comprising:

a plurality of multitime-slot bidirectional data buses, base switch means connected to said data buses for switching first encoded data between specified time slots on said plurality of buses, a plurality of subscriber lines, subscriber switch means connected to said plurality of subscriber lines and to a pair of said bidirectional buses for encoding and switching data on one or more of said subscriber lines to one or more specified time slots, respectively, on either bus of said pair of buses, whereby said base switch means switches the encoded data to other specified time slots on said plurality of buses, said base switch means connected to receive second encoded data on said plurality of buses for switching said second encoded data to other specified time slots on either of said pair of buses, each subscriber switch means connected to receive said second encoded data for decoding said second encoded data and for switching the resulting decoded data to said one or more subscriber lines, said subscriber switch means including means for encoding other data on said subscriber lines, thereby forming third encoded data, interchanger means having a plurality of channel unit locations corresponding to said subscriber lines and means for switching said third encoded data between specified ones of said locations in said interchanger means, means for decoding said switched encoded data, and means for switching the decoded data resulting from the latter operation to specified ones of said subscriber lines.

* * * * *